United States Patent [19]
Kobayashi

[11] Patent Number: 5,828,640
[45] Date of Patent: Oct. 27, 1998

[54] APPARATUS AND METHODS FOR GENERATING ERROR CORRECTION CODES FOR USE IN AN INFORMATION RECORDING DEVICE

[75] Inventor: Seiji Kobayashi, Kanagawa, Japan

[73] Assignee: Sony Corporation, Tokyo, Japan

[21] Appl. No.: 869,826

[22] Filed: Jun. 5, 1997

Related U.S. Application Data

[62] Division of Ser. No. 588,600, Jan. 18, 1996, Pat. No. 5,699,337.

[30] Foreign Application Priority Data

Jan. 20, 1995 [JP] Japan .................................. 7-006903

[51] Int. Cl.⁶ ...................................................... G11B 7/00
[52] U.S. Cl. ................................................. 369/59; 369/54
[58] Field of Search ........................... 369/275.1, 275.2, 369/275.3, 275.4, 59, 48, 47, 58, 54

[56] References Cited

U.S. PATENT DOCUMENTS

| | | | |
|---|---|---|---|
| 5,557,592 | 9/1996 | Kobayashi et al. | 369/48 |
| 5,566,158 | 10/1996 | Kobayashi et al. | 369/48 |
| 5,615,193 | 3/1997 | Kobayashi et al. | 369/275.3 |
| 5,699,337 | 12/1997 | Kobayashi | 369/48 |

FOREIGN PATENT DOCUMENTS 3-167585  12/1992  Japan .
5-20876   3/1994  Japan .

*Primary Examiner*—Nabil Hindi
*Attorney, Agent, or Firm*—Limbach & Limbach L.L.P.

[57] ABSTRACT

The invention provides an apparatus containing a modulating circuit which can be used with an information recording device or the like, capable of correcting an error due to the change in RF signal level caused by noise or the like without a significant reduction in the storage capacity of the associated recording medium. The modulating circuit generates a signal corresponding to digital information consisting of units, each consisting of a predetermined plurality of bits. These units are assigned coordinate points in a two-dimensional plane and grouped according to their proximity to each other. Predetermined bits of each unit are mapped according to whether the value of the bits is 1 or 0. Based on this mapping process, error correction codes are output. The resultant error correction code is added at part of the bits comprising the predetermined plurality of bits.

14 Claims, 27 Drawing Sheets

OUTPUT OF THE PULSE
DELAY CIRCUIT 112

7 ← 0
VALUE OF X

OUTPUT OF THE PULSE
DELAY CIRCUIT 113

0 → 7
VALUE OF Y

OUTPUT OF THE
OR GATE 114

7 ← 0           0 → 7
VALUE OF X     VALUE OF Y

OUTPUT OF THE
T-FLIP-FLOP 115

7 ← 0           0 → 7
VALUE OF X     VALUE OF Y

PIT

APPARATUS AND METHODS FOR GENERATING ERROR CORRECTION CODES FOR USE IN AN INFORMATION RECORDING DEVICE

This is a divisional of application Ser. No. 08/588,600, filed Jan. 18, 1996 now U.S. Pat. No. 5,699,337.

BACKGROUND OF THE INVENTION

1. Field of the Invention

The present invention relates to an information recording apparatus, information reproducing apparatus, and information recording medium, suitable for recording digital information on an optical disk or the like.

2. Description of the Related Art

It is known in the art, as disclosed for example in Japanese Patent No. 3-167585 (1991), to record digital information (multi-level information) consisting of units of data each consisting of a plurality of bits by assigning each unit of the digital information one information pit formed on an optical disk or the like in such a manner that the position of the leading edge or the trailing edge of the information pit is discretely shifted from a base position by an amount according to the value of the digital information to be recorded. In this technique, it is possible to form a pit having a high-precision length and it is possible to change the pit edge very precisely. This means that it is possible to record digital information by forming a very small change in the edge position and thus it is possible to record digital information at a very high density which cannot be achieved by other known techniques.

FIG. 1 illustrates the principle of recording digital information by discretely shifting the edge position. In a recording operation, as shown in FIG. 1, a PWM-modulated record signal (FIG. 1B) is generated from digital information to be recorded and pits (FIG. 1A) are formed so that the edges of each pit corresponds to the zero-crossing positions of the record signal. In this technique, the edges of each pit are formed at locations which are shifted by a discrete amount from the base positions corresponding to the edges of the reference clock signal (FIG. 1C). Thus each edge can represent data (information) which can have one of a predetermined number of levels, for example 8 levels from 0 to 7, by changing the edge position according to the level.

FIG. 2 illustrates the principle of a technique of reproducing a signal which has been recorded in the above-described manner. In a reproducing operation, an RF signal (reproduction signal) (FIG. 2A) is reproduced from an information recording medium such as an optical disk and amplified to a greater level. Thus a two-level RF signal (FIG. 2B) is obtained. A reference clock signal (FIG. 2C) is generated on the basis of clock pits formed on the optical disk. A saw-tooth signal (FIG. 2D) is then generated in synchronization with the reference clock signal. The edge position of an information pit is detected by detecting the timing at which the saw-tooth signal and the two-level RF signal cross each other.

In this technique, however, a complicated circuit is required to reproduce information by detecting the edge position of the information pit using the saw-tooth signal. To avoid this problem, the inventors of the present invention have proposed a technique to form an information pit, which is disclosed in Patent Application No. 5-20876 (1993).

In this technique, the edge position of the information pit is changed within a predetermined shifting period smaller than the rising time tr or falling time tf (FIG. 2A) or the transient period (approaching a steady state) of the reproduction signal wherein the transient period depends on the transfer characteristic of a reproducing optical system via which the information recording medium is scanned with a light beam thereby reproducing the signal corresponding to information pits.

The transfer characteristic of the reproducing optical system can be defined by its MTF (modulation transfer function) which is the absolute value of the OTF (optical transfer function) wherein the MTF depends on the numerical aperture (NA) of the lens constituting the reproducing optical system and also on the wavelength λ of the light beam emerging from the lens.

In this technique, the information corresponding to the edge position of each information pit can be obtained by detecting the level of the RF signal during the transient period of each sample.

The recording technique described above is referred to as the SCIPER (single carrier independent pit edge recording) technique.

The reproduction signal extracted from an optical disk generally includes reading errors due to small defects present on the surface of the disk. Error correction codes are used so as to correctly reproduce the data even when there is an error due to a defect in the reproduction signal.

In the case of CDs (compact disks), for example, information is recorded byte by byte and thus information is also reproduced byte by byte. Therefore, the error correction code is added to the data in such a manner that the error correction code may correct an error in each unit data consisting of one byte.

In the SCIPER technology, since information is recorded by shifting the edge position of information pits by a small amount, if the RF signal contains noise due to a disturbance in the edge position of information pits or contains thermal noise arising from the electronic system (electronic detection system), a slight deviation occurs in the level of the RF signal and this deviation can cause the information to be incorrectly decoded into a value corresponding to an adjacent edge position thereby creating an error. Thus, it is known to use an error correction code not only to correct an error due to defects but also to correct an error due to noise.

In most cases, however, the error of the above-described type due to the slight disturbance in the level of the RF signal contains only one or a few bit changes. If an error correction code is designed to correct an error for each byte of data, the error correction code requires a long code length. This causes a great reduction in the effective storage capacity. Therefore, such an error correction code is not suitable for correcting a 1-bit or 2-bit error.

OBJECT AND SUMMARY OF THE INVENTION

It is an object of the present invention to solve the above problems. More specifically, it is an object of the present invention to provide a technique of efficiently correcting an error due to a slight disturbance in the level of an RF signal.

According to a first aspect of the invention, there is provided an information recording apparatus for recording digital information by forming an information pit on an information recording medium, wherein the information recording apparatus is characterized in that: the digital information consisting of units each consisting of a predetermined plurality of bits is recorded by assigning each unit consisting of the plurality of bits one information pit in such a manner that the shape of the information pit is discretely changed according to the value of each unit consisting of the plurality of bits; and there is provided error correction code adding means for adding an error correction code for correcting an error in part of bits of the plurality of bits.

According to a 2nd aspect based on the 1st aspect, there is provided an information recording apparatus in which the information pit is formed as a physically recessed or raised portion on the information recording medium; and the depth or height of the information pit is changed in a discrete fashion according to the value of the unit of digital information consisting of the predetermined plurality of bits.

According to a 3rd aspect of the invention based on the 1st aspect, there is provided an information recording apparatus in which the position of the rising edge or the falling edge of the information pit is changed in a discrete fashion according to the value of the unit of the digital information consisting of the predetermined plurality of bits.

According to a 4th aspect of the invention based on the 1st aspect, there is provided an information recording apparatus in which the positions of both the rising edge and the falling edge of the information pit are changed in a discrete fashion according to the value of the unit of the digital information consisting of the predetermined plurality of bits. According to a 5th aspect of the invention based on the 4th aspect, there is provided an information recording apparatus in which each unit of the digital information consisting of the plurality of bits is assigned a coordinate point in a two-dimensional plane, and the positions of the rising and falling edges of the information pit are changed corresponding to the x and y coordinates, respectively, of the coordinate point. According to a 6th aspect of the invention based on the 5th aspect, there is provided an information recording apparatus in which the coordinate points in the two-dimensional plane defined in relation to the respective values that the digital information consisting of the plurality of bits can have are divided into two groups so that any coordinate points nearest to each other are separated into different groups; mapping is performed with respect to a predetermined bit in such a manner that digital information consisting of the plurality of bits having a value whose predetermined bit is 0 is assigned a coordinate point belonging to one group and digital information having a value whose predetermined bit is 1 is assigned a coordinate point belonging to the other group; and the coordinate points belonging to each group are divided into two subgroups so that any coordinate points nearest to each other are separated into different subgroups; and mapping is performed with respect to another predetermined bit of the digital information in a similar manner so that digital information consisting of the plurality of bits is assigned a coordinate point in either subgroup, whereby the digital information consisting of the plurality of bits is assigned a coordinate point in the two-dimensional plane.

According to a 7th aspect of the invention based on the 6th aspect, there is provided an information recording apparatus in which mapping with respect to the bit at which the error correction code is added by the error correction code adding means is performed at an earlier mapping process stage than mapping with respect to the other bits. According to an 8th aspect of the invention based on the 7th aspect, there is provided an information recording apparatus in which the error correction code adding means adds an error correction code for correcting an error at a predetermined bit of digital information consisting of the plurality of bits; and mapping with respect to that bit at which the error correction code is added by the error correction code adding means is performed first. According to a 9th aspect of the invention based on the 7th aspect, there is provided an information recording apparatus in which the error correction code adding means adds error correction codes for correcting an error at predetermined two bits of digital information consisting of the plurality of bits; and mapping with respect to one of the predetermined bits at which the error correction code is added by the error correction code adding means is performed first, and mapping with respect to the other of the predetermined bits is performed next. According to a 10th aspect of the invention based on the 9th aspect, there is provided an information recording apparatus in which the error correction codes for correcting an error at the predetermined two bits of digital information consisting of the plurality of bits have different error correcting abilities from each other; and mapping with respect to the bit at which the error correction code having a higher correcting ability is added is performed earlier than mapping with respect to the other bit.

According to an 11th aspect of the invention based on any of aspects 3 to 10, there is provided an information recording apparatus in which the edge position of the information pit is changed within a predetermined shifting period smaller than the transient period of a signal reproduced by scanning the information recording medium with a light beam via a reproducing optical system, wherein the transient period depends on the transfer characteristic of the reproducing optical system. According to a 12th aspect of the invention based on any of the aspects 1 to 11, there is provided an information recording apparatus in which the error correction code adding means adds a BCH (Bose-Chaudhuri-Hocquenghem) code or a convolution code.

According to a 13th aspect of the invention, there is provided an information recording apparatus for recording digital information in units of a predetermined plurality of bits, wherein the information recording apparatus is characterized in that: the coordinate points in the two-dimensional plane defined in relation to the respective values that the digital information consisting of the plurality of bits can have are divided into two groups so that any coordinate points nearest to each other are separated into different groups; mapping is performed with respect to a predetermined bit in such a manner that digital information consisting of the plurality of bits having a value whose predetermined bit is 0 is assigned a coordinate point belonging to one group and digital information having a value whose predetermined bit is 1 is assigned a coordinate point belonging to the other group; the coordinate points belonging to each group are divided into two subgroups so that any coordinate points nearest to each other are separated into different subgroups; and mapping is performed with respect to another predetermined bit of the digital information in a similar manner so that digital information consisting of the plurality of bits is assigned a coordinate point in either subgroup; thereby recording the x and y coordinates of the coordinate point corresponding to the digital information consisting of the plurality of bits.

According to a 14th aspect of the invention based on the 13th aspect, an error correction code for correcting an error at a part of bits of the digital information in units of the predetermined plurality of bits is added in advance. According to a 15th aspect of the invention based on the 14th aspect, there is provided an information recording apparatus in which mapping with respect to the bit at which the error correction code is added is performed at an earlier mapping process stage than mapping with respect to the other bits. According to a 16th aspect of the invention based on the 15th aspect, there is provided an information recording apparatus in which an error correction code for correcting an error at a predetermined bit of digital information consisting of the plurality of bits is added in advance; and mapping with respect to that bit is performed first. According to a 17th aspect of the invention based on the 15th aspect, there is provided an information recording apparatus in which error correction codes for correcting an error at predetermined two bits of digital information consisting of the plurality of bits are added in advance; and mapping with respect to one of the predetermined bits is performed first, and mapping with respect to the other of the predetermined bits is performed next. According to an 18th aspect of the invention based on the 17th aspect, there is provided an information recording apparatus in which the error correction codes for correcting an error at the predetermined two bits of digital information consisting of the plurality of bits have different error correcting abilities from each other; and mapping with respect to the bit at which the error correction code having a higher correcting ability is added is performed earlier than mapping with respect to the other bit. According to a 19th aspect of the invention based on any of aspects 14 to 18, there is provided an information recording apparatus in which the error correction code is a BCH (Bose-Chaudhuri-Hocquenghem) code or a convolution code.

According to a 20th aspect of the invention, there is provided an information reproducing apparatus for reproducing digital information from an information recording medium on which an information pit is formed using an information recording apparatus according to any of aspects 1 to 19.

According to a 21st aspect of the invention there is provided an information reproducing apparatus for reproducing digital information from an information recording medium on which an information pit is formed using an information recording apparatus according to aspect 7 or 15, wherein the information reproducing apparatus comprises: reproducing means (such as a pick-up 22 shown in FIG. 18) for reproducing a reproduction signal corresponding to the x and y coordinates from the information recording medium; and decoding means (such as an error correcting circuit 35 shown in FIG. 18) for decoding the reproduction signal in such a manner that: a bit with respect to which the first mapping has been performed is reproduced from the reproduction signal on the basis of the coordinate point in the two-dimensional plane; error correction is performed for that bit using the error correction code; another bit is decoded on the basis of the coordinate point of those used in the previous decoding process, the coordinate point being assigned the bit corresponding to the result of the error correction; error correction is performed for the bit using the error correction code; the process of decoding a bit and performing error correction on that bit is performed repeatedly until the part of bits, at which the error correction code is added, of the digital information consisting of the plurality of bits have been completely decoded; and, of the coordinate points used in the final decoding process, those coordinate points which are assigned the bit consistent with the result of the error correction are used to decode the reproduction signal.

According to a 22nd aspect of the invention, there is provided an information reproducing apparatus for reproducing digital information from an information recording medium on which an information pit is formed using an information recording apparatus according to aspect 8 or 16, wherein the information reproducing apparatus comprises: reproducing means (such as a pick-up 22 shown in FIG. 18) for reproducing a reproduction signal corresponding to the x and y coordinates from the information recording medium; and decoding means (such as an error correcting circuit 35 shown in FIG. 18) for decoding the reproduction signal in such a manner that: a bit with respect to which the first mapping has been performed is reproduced from the reproduction signal on the basis of the coordinate point in the two-dimensional plane; error correction is performed for that bit using the error correction code; and of the coordinate points used to reproduce that bit, those coordinate points which are assigned the bit consistent with the result of the error correction are used to decode the reproduction signal.

According to a 23rd aspect of the invention, there is provided an information reproducing apparatus for reproducing digital information from an information recording medium on which an information pit is formed using an information recording apparatus according to any of the aspects 9, 10, 17 and 18, wherein the information reproducing apparatus comprises: reproducing means (such as a pick-up 22 shown in FIG. 18) for reproducing a reproduction signal corresponding to the x and y coordinates from the information recording medium; and decoding means (such as an error correcting circuit 35 shown in FIG. 18) for decoding the reproduction signal in such a manner that: a first bit with respect to which the first mapping has been performed is reproduced from the reproduction signal on the basis of the coordinate point in the two-dimensional plane; error correction is performed for the first bit using the error correction code; a second bit with respect to which the next mapping has been performed is decoded on the basis of the coordinate point of those used to decode the first bit, the coordinate point being assigned the bit corresponding to the result of the error correction for the first bit; error correction is performed for the second bit using the error correction code; and of the coordinate points used to reproduce the second bit, those coordinate points which are assigned the bit consistent with the result of the error correction are used to decode the reproduction signal.

According to a 24th aspect of the invention based on any of aspects 21 to 23, there is provided an information reproducing apparatus wherein the error correction code is a BCH (Bose-Chaudhuri-Hocquenghem) code or a convolution code.

According to a 25th aspect of the invention, there is provided an information recording medium on which digital information has been recorded using an information recording apparatus according to any of aspects 1 to 19.

In the information recording apparatus according to the 1st aspect of the invention, the digital information consisting of units each consisting of a predetermined plurality of bits is recorded by changing the shape of an information pit in a discrete fashion according to each unit consisting of the plurality of bits thereby assigning each unit consisting of the plurality of bits one information pit; and an error correction code for correcting an error in part of the plurality of bits is added. This allows a reduction in the data length of the error correction code without a significant reduction in the recording capacity.

In another information recording apparatus according to the invention, the coordinate points in the two-dimensional plane defined in relation to respective values, that the digital information consisting of a predetermined plurality of bits can have, are divided into two groups so that any coordinate points nearest to each other are separated into different groups; mapping is performed with respect to a predetermined bit in such a manner that digital information consisting of the plurality of bits having a value whose predetermined bit is 0 is assigned a coordinate point belonging to one group and digital information having a value whose predetermined bit is 1 is assigned a coordinate point belonging to the other group; the coordinate points belonging to each group are divided into two subgroups so that any coordinate points nearest to each other are separated into different subgroups; and mapping is performed with respect to another predetermined bit of the digital information in a similar manner so that digital information consisting of the plurality of bits is assigned a coordinate point in either subgroup, thereby recording the x and y coordinates of the coordinate point corresponding to the digital information consisting of the plurality of bits. In this information recording apparatus, even if fluctuations occur in the RF signal level during a reproducing operation, substantially no error occurs in bits with respect to which mapping is performed at late process stages, and thus it is possible to effectively correct an error only by adding an error correction code for those bits with respect to which mapping is performed at early process stages without a significant reduction in the recording capacity.

In the information reproducing apparatus according to the invention, digital information is reproduced from an information recording medium on which an information pit is formed using an information recording apparatus according to any of aspects 1 to 19, wherein a reproduction signal corresponding to the x and y coordinates is reproduced from the information recording medium; a bit with respect to which the first mapping has been performed is reproduced from the reproduction signal on the basis of the coordinate point in the two-dimensional plane; error correction is performed for that bit using the error correction code; of the coordinate points used in the previous decoding process, those coordinate points which are assigned the bit consistent with the result of the error correction are used to decode another bit with respect to which the next mapping has been perform; error correction is performed for that bit using the error correction code; the above-described process of decoding a bit and performing error correction on that bit is performed repeatedly until the part of bits, at which the error correction code is added, of the digital information consisting of the plurality of bits have been completely decoded; and of the coordinate points used in the final decoding process, those coordinate points which are assigned the bit consistent with the result of the error correction are used to decode the reproduction signal, thereby preventing bit errors due to the fluctuations in the RF signal level.

In the information recording medium according the invention, digital information is recorded on the information recording medium using an information recording apparatus according to any of aspects 1 to 19, and thus an error which may occur due to a slight fluctuation in the RF signal level during a reproducing operation can be effectively corrected.

DESCRIPTION OF THE PREFERRED EMBODIMENTS

Figure 1:
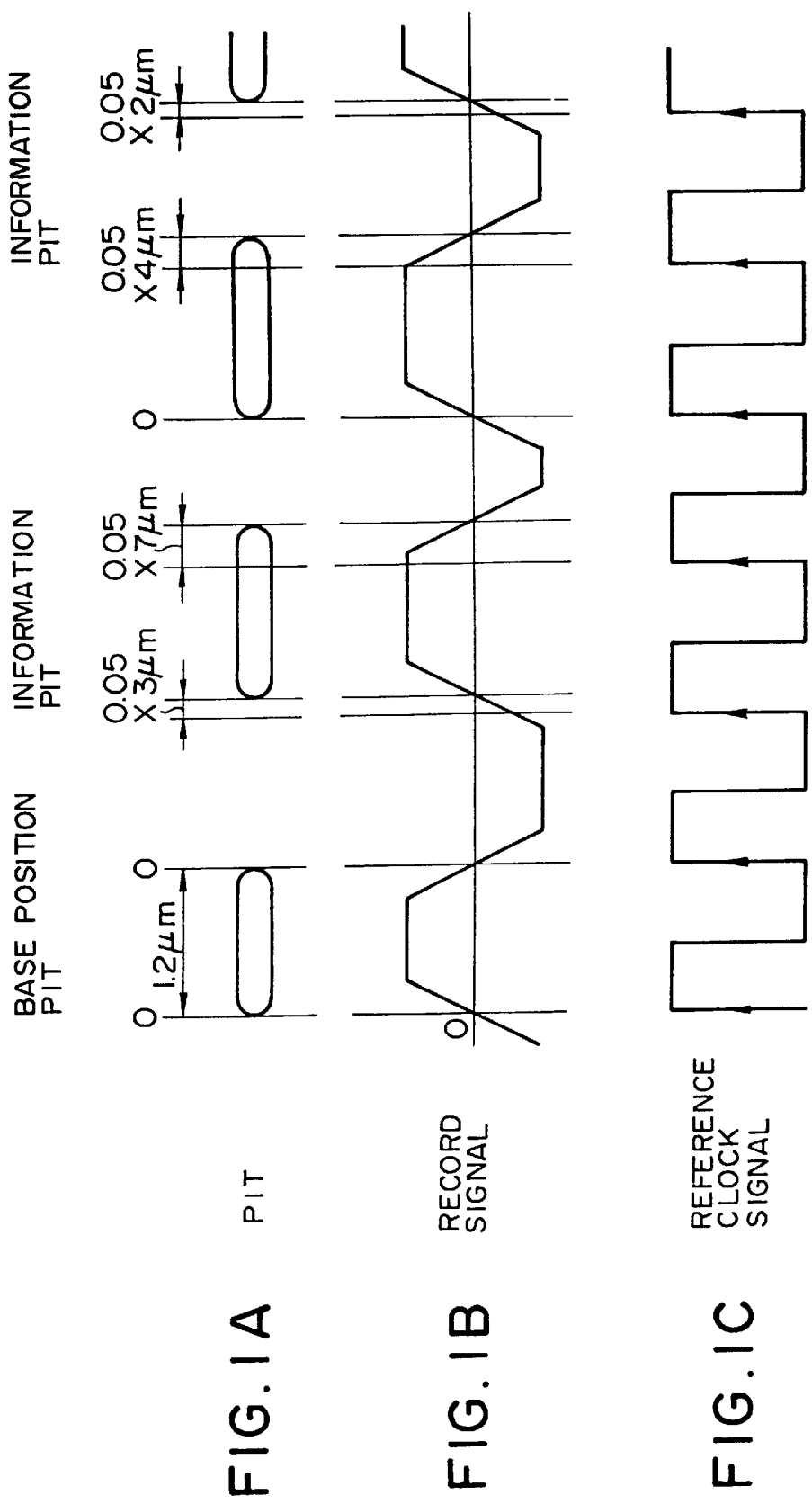
FIG. 1 is a schematic representation illustrating the principle of recording data by forming pits whose edge positions are changed according to the data to be recorded.
Figure 2:
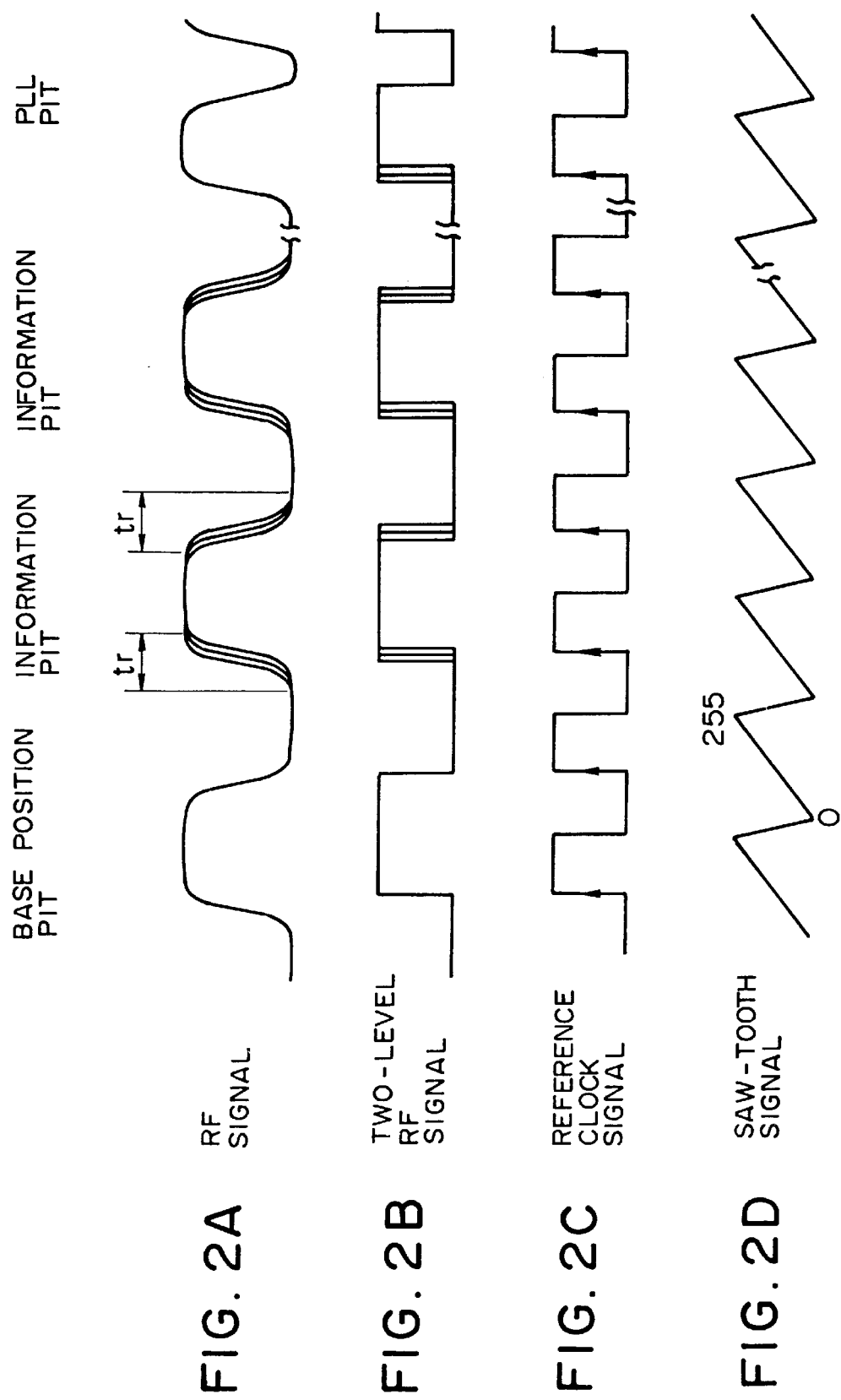
FIG. 2 is a schematic representation illustrating the principle of reproducing data from pits whose edge positions are changed in a discrete fashion.
Figure 3:
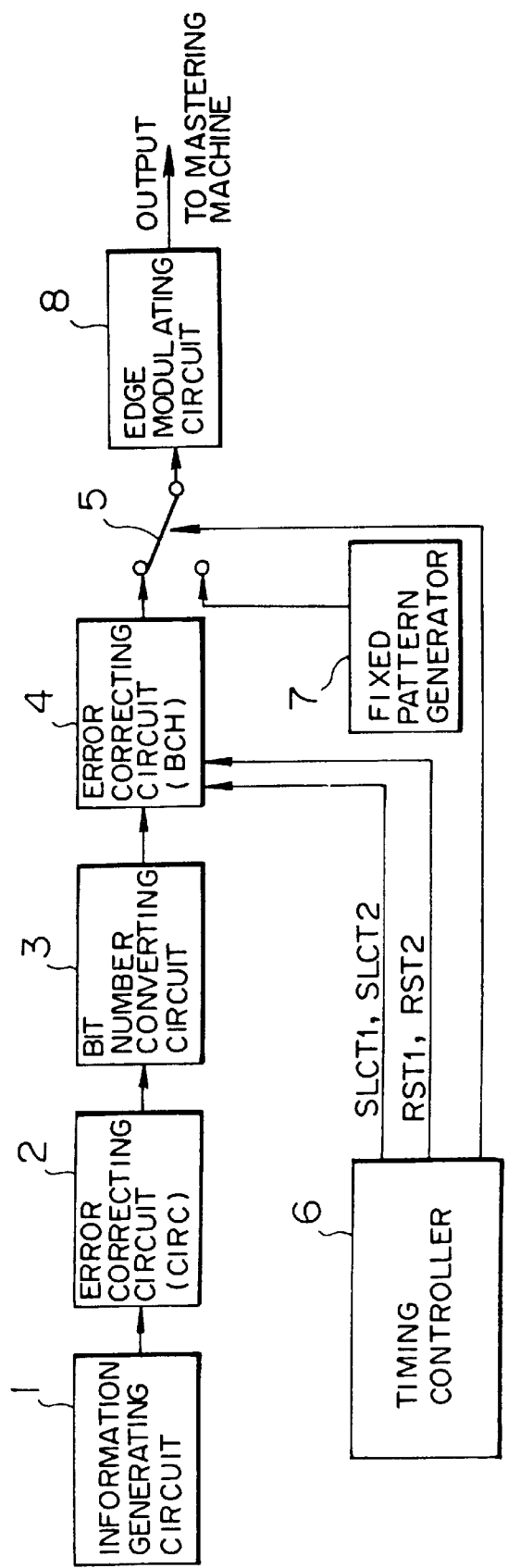
FIG. 3 is a block diagram of an embodiment of an information recording apparatus according to the present invention.

FIG. 3 is a block diagram of an embodiment of an information recording apparatus according to the present invention. In this information recording apparatus, information is recorded on an optical disk for example according to the SCIPER technique described above.

An information generating circuit 1 generates digital information to be recorded on the optical disk. An error correcting circuit 2 calculates an error correction code used to correct a bit error mainly due to defects present on the surface of the disk. A unit-data-length conversion circuit 3 converts the unit data length of the data received from the error correcting circuit 2 to another unit data length. An error correcting circuit 4 calculates an error correction code used to correct a bit error mainly due to noise. A timing controller 6 generates a timing signal in a predetermined form. The error correcting circuit 4 operates in response to the timing signal generated by the timing controller 6.

Under the control of the timing controller, a switch 5 selects either the output terminal of the error correcting circuit 4 or the output terminal of a fixed pattern generator 7 so that the output is switched periodically by the switch 5 thereby multiplexing the output signals of the error correcting circuit 4 and the fixed pattern generator 7 in a time-division fashion and thus sending the output signals of these elements to an edge modulating circuit 8.

The timing controller 6 not only controls the switching operation of the switch 5 but also generates timing signals (SLCT1, SLCT2, RST1, RST2) which are sent to the error correcting circuit 4. The fixed pattern generator 7 generates a fixed pattern which is used as clock information and also used to eliminate fluctuations such as bias fluctuations or gain fluctuation. The edge modulating circuit 8 modulates the edges of a carrier pulse in response to the data given via the switch 5 from the error correcting circuit 4 or the fixed pattern generator 7.

The operation of the information recording apparatus shown in FIG. 3 will be described in further detail below. The information generating circuit 1 outputs a digital signal (digital information) obtained by converting an audio signal such as a music signal into a digital form. The output digital signal is applied to the error correcting circuit 2. The error correcting circuit 2 calculates the error correction code in the same manner as in CDs. That is, the error correcting circuit 2 calculates a CIRC (cross interleave Reed-Solomon code) which is a combination of the Reed-Solomon code having a high ability of correcting random errors and means of converting a burst error into a random error in an interleaved fashion.

The CIRC described above is used to correct bit errors mainly due to defects on a disk. The CIRC is calculated for each sequence of 8 bits (1 byte).

This error correction code (CIRC) is added to the digital signal supplied from the information generating circuit 1. Thus, for example, the error correcting circuit 2 combines a 24-byte digital signal and an 8-byte error correction code into 32-byte data. Furthermore, the error correcting circuit 2 adds a sub-code representing the information about the order of music programs, the time thereof, etc., to the above resultant 32-byte data thereby generating 33-byte (264 bit) data as shown in FIG. 4.

Figure 4:
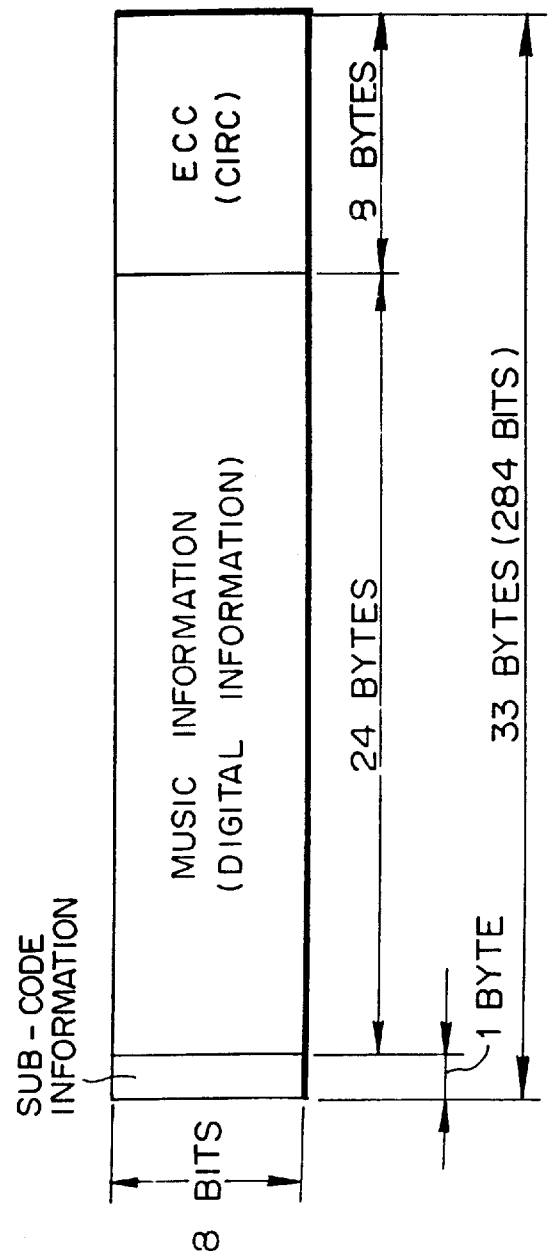
FIG. 4 is a schematic representation of a format of data output from an error correcting circuit 2.
Figure 5:
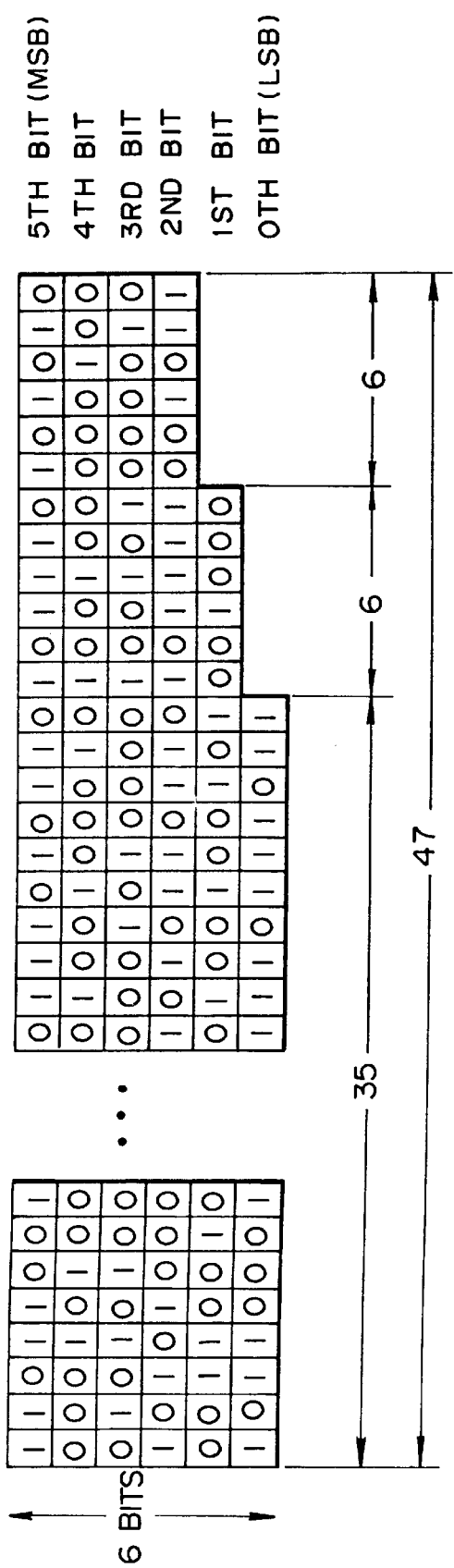
FIG. 5 is a schematic representation of a format of data output from a unit-data-length conversion circuit 3.

The error correction code (CIRC) has a width of 8 bits, as described above, and thus each 33 byte data output from the error correcting circuit 2 consists of data units each consisting of 8 bits as shown in FIG. 4. On the other hand, data is recorded on a disk in units of 6 bits (each pit is assigned information represented by 6 bits) as will be described in further detail later. Thus, the unit-data-length conversion circuit 3 converts the data in the format of 8-bit unit length into 6-bit unit length. That is, if the unit-data-length conversion circuit 3 receives 33-byte data in the 8-bit format, the unit-data-length conversion circuit 3 converts the received data into data in the format consisting of 6 bits×35, 5 bits×6, and 4 bits×6. FIG. 5 schematically illustrates the format of the resultant 33-byte (264 bit) data obtained after the conversion. That is, the bits of the data are arranged in a matrix fashion including 6 bits×35 rows, 5 bits×6 rows, and 4 bits×6 rows. Alternatively, the data may also be converted into another format in which each unit of data is placed along a horizontal line (from right to left or from left to right) as opposed to the above example in which each unit of data is placed along a vertical line.

In the example of the data format shown in FIG. 5, the most significant bits (MSB) are placed in the top line, the least significant bits (LSB) are placed in the bottom line, and the other bits from 1st to 4th bits are placed between the LSB and MSB.

After the conversion by the unit-data-length conversion circuit 3, the data includes 5 bits×6 rows and 4 bits×6 rows, and thus there are two blank areas when the data is considered to have a structure consisting of data units each having 6-bit unit length, wherein one blank area is located along 12 0th bits (LSBs) and the other blank area is located along 6 1st bits as shown in FIG. 5. In these blank areas, error correction codes for correcting an error in the 0th and 1st bits created by the error correcting circuit 4 are placed.

That is, after being converted into the 6-bit format by the unit-data-length conversion circuit 3, the resultant 33-byte data are sent to the error correcting circuit 4. The error correcting circuit 4 generates error codes for correcting a single-bit error to the 33-byte data and places the error codes in the blank areas. For example, the BCH (Bose-Chaudhuri-Hocquenghem) code may be employed as the error code for the above purpose. The BCH code is particularly effective for correcting a bit error due to the disturbance in the RF signal level caused mainly by noise.

Figure 6:
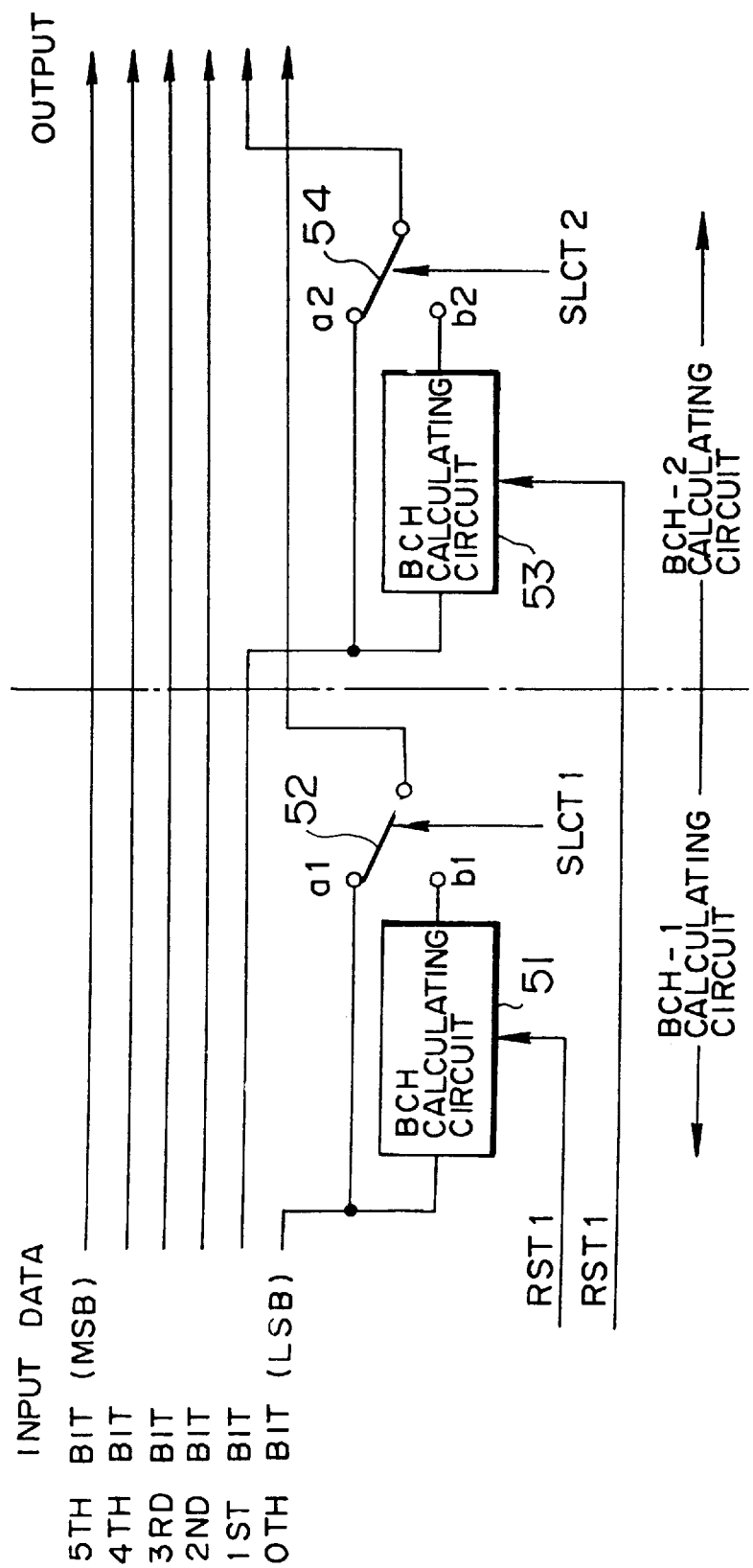
FIG. 6 is a block diagram illustrating the details of an error correcting circuit 4.

FIG. 6 illustrates in greater detail the error correcting circuit 4. The left-half part of the error correcting circuit 4 shown in FIG. 4 generates an error correction code (BCH code) for the 0th bit, while the right-half part generates an error correction code (BCH code) for the 1st bit.

Before the 33-byte data shown in FIG. 5 is applied to the error correcting circuit 4, the timing controller 6 sends reset signals RST1 and RST2 to the BCH calculating circuits 51 and 53, respectively, thereby initializing these circuits.

The timing controller 6 also sends an L-level switching control signal SLCT1 to the switch 52 for a time period during which the portion of the data consisting of 6 bits×35 rows shown in FIG. 5 is applied to the error correcting circuit 4, while the timing controller 6 sends an H-level switching control signal SLCT1 to the switch 52 for a time period during which the remaining data including the 5 bits×6 rows portion and the 4 bits×6 rows portion are applied to the error correcting circuit 4. On the other hand, when the parts of the data including 6 bits×35 rows and 5 bits×6 rows are applied to the error correcting circuit 4, an L-level switching control signal SLCT2 is sent from the timing controller 6 to the switch 54, while an H-level switching control signal SLCT2 is applied to the switch 54 for a time period during which the remaining part of the data consisting of 4 bits×6 rows is applied to the error correcting circuit 4.

In response to the respective switching control signals SLCT1 and SLCT2, the switches 52 and 54 operate in such a manner that the terminal a1 or a2 is selected when the switching control signal SLCT1 or SLCT2 is at an L-level and the terminal b1 or b2 is selected when the switching control signal SLCT1 or SLCT2 is at an H-level. Therefore, for the time period during which the part of the data consisting of 6 bits×35 rows is applied to the error correcting circuit 4 after the BCH calculating circuits 51 and 53 are reset, both the switching control signals SLCT1 and SLCT2 are at the L-level, and thus the switches 52 and 54 select the terminals a1 and a2, respectively.

As a result, during this time period, the 0th bits of the data shown in FIG. 5 are applied to the terminal a1 of the switch 52 and to the BCH calculating circuit 51, and the 1st bits are applied to the terminal a2 of the switch 54 and to the BCH calculating circuit 53. The other bits, that is the 2nd to 5th bits, are directly output.

In this case, the 2nd to 5th bits of the 6 bits×35 rows part of the data are directly output, and the 0th and 1st bits are output via the switch 52 or 54 without being subjected to any processes, and thus the entire 6 bits×35 rows part of the data is output from the error correcting circuit 4 without being changed.

Figure 7:
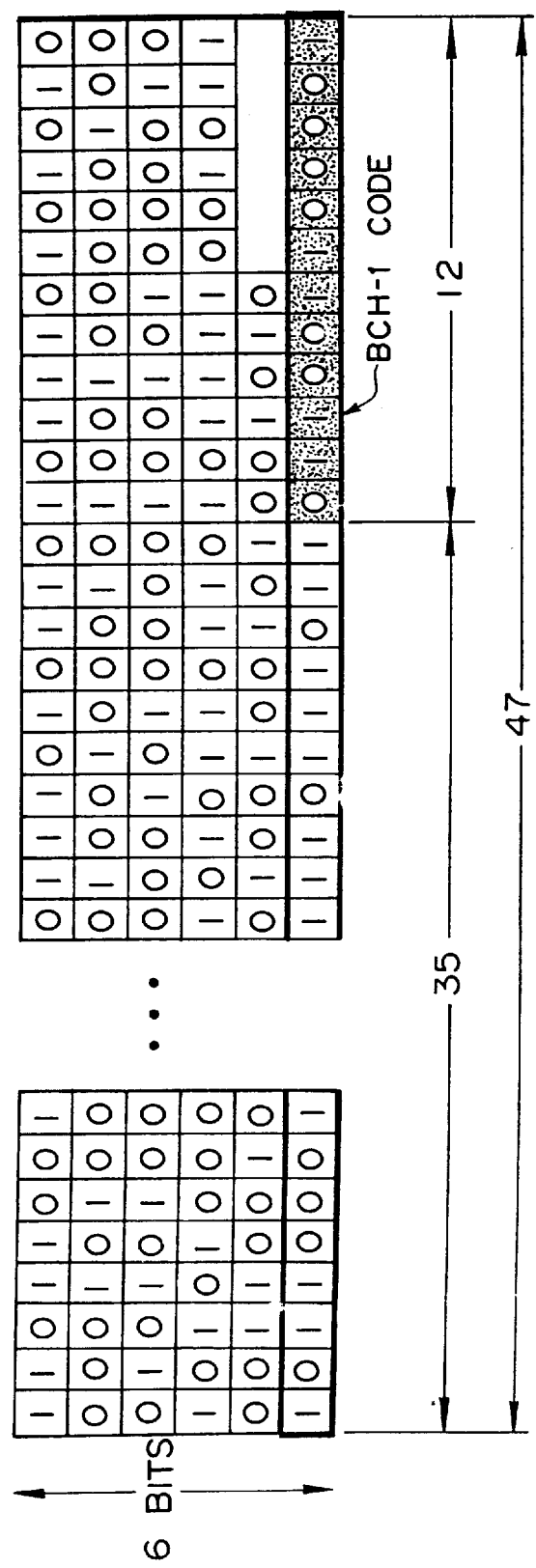
FIG. 7 is a schematic representation of data obtained by adding a BCH code calculated by the BCH calculating circuit 51 shown in FIG. 6 to the data shown in FIG. 5.

During the above time period, the BCH calculating circuit 51 calculates the BCH code serving as an error correction code for the 0th bits of the 6 bits×35 rows part of the data (the 0th bits are shown in the rectangular area surrounded by the thick lines in FIG. 7) wherein this BCH code is here referred to as the BCH-1 code. Thus, a 12-bit BCH code for correcting an error in 35 0th bits is generated.

After that, when inputting of the 5 bits×6 rows part of the data shown in FIG. 5 is started, the switching control signal SLCT1 changes from the L-level to an H-level and thus the switch 52 switches the connection so that the terminal b1 is selected. As a result, the 12-bit BCH-1 code is output at the 0th bits of the following data from the BCH calculating circuit 51 via the switch 52. Thus, the blanks along the 0th bits shown in FIG. 5 are filled with this 12-bit BCH-1 code, as shown in the shaded area in FIG. 7.

Figure 8:
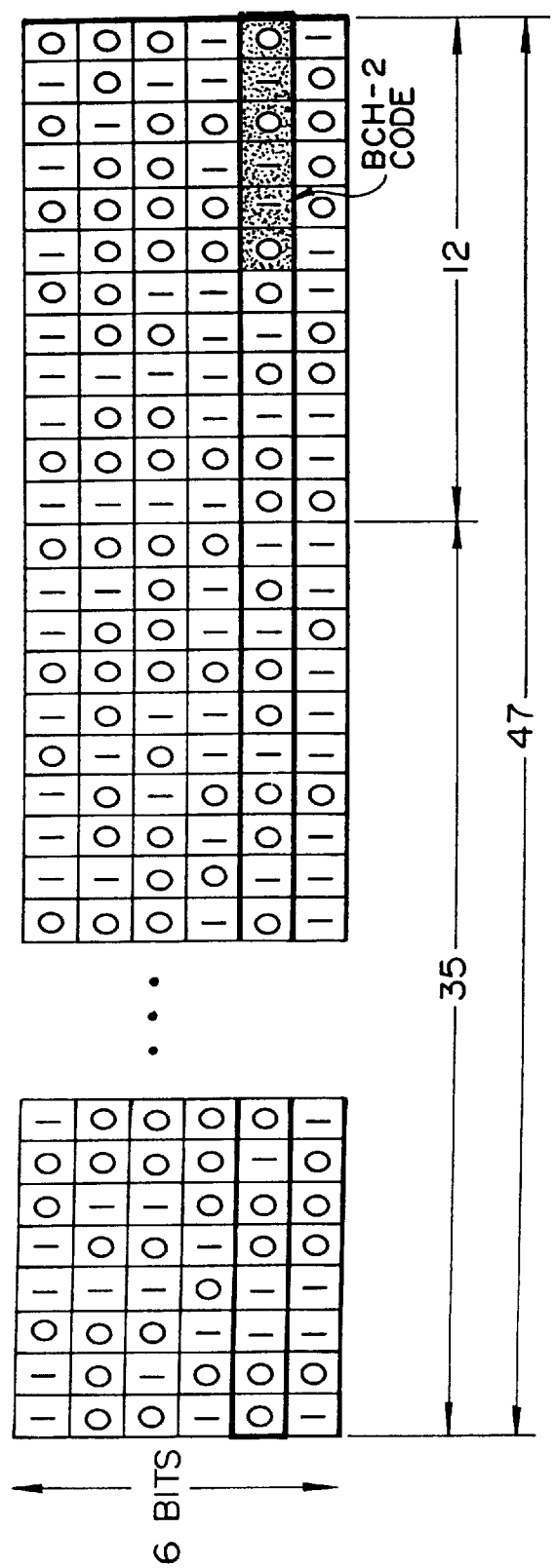
FIG. 8 is a schematic representation of data obtained by adding a BCH code calculated by the BCH calculating circuit 53 shown in FIG. 6 to the data shown in FIG. 7.

During the above time period, the BCH calculating circuit 52 calculates the BCH code serving as an error correction code for the 1st bits of the 6 bits×35 rows part and 5 bits×6 rows part of the data (these 1st bits are shown in the rectangular area surrounded by the thick lines in FIG. 8) wherein this BCH code is here referred to as the BCH-2 code. Thus, a 6-bit BCH code for correcting an error in 41 (=35+6) 1st bits is obtained.

After that, when inputting of the 4 bits×6 rows part of the data shown in FIG. 5 is started, the switching control signal SLCT2 is changed from the L-level to an H-level, and thus the switch 54 switches the connection so that the terminal b2 is selected. As a result, the 6-bit BCH-2 code is output as the 1st bits of the following data from the BCH calculating circuit 53 via the switch 54. Thus, the blanks along the 1st bits shown in FIG. 5 are filled with this 6-bit BCH-2 code as shown in the shaded area in FIG. 8.

As described above, the 12-bit BCH-1 code is added at the 35 0th bits and the 6-bit BCH-2 code is added at the 41 1st bits. As a result, the data comes to have a structure consisting of 47 rows wherein each row consists of 6 bits from the 0th bit to 5th bit with no blanks.

In the event that an error occurs in some of the 35 0th bits of the data, if the number of bits having an error is two or less (one-bit error or two-bit error), the 12-bit BCH-1 code can detect the error and correct it so that correct data is obtained. On the other hand, in the event that an error occurs in some of the 41 1st bits of the data, if an error occurs only in a certain one bit (one-bit error), the 6-bit BCH-2 code can detect the error and correct it. This means that the BCH-1 code for the 0th bits has a higher ability of correcting an error than the BCH-2 code for the 1st bits.

Figure 9:
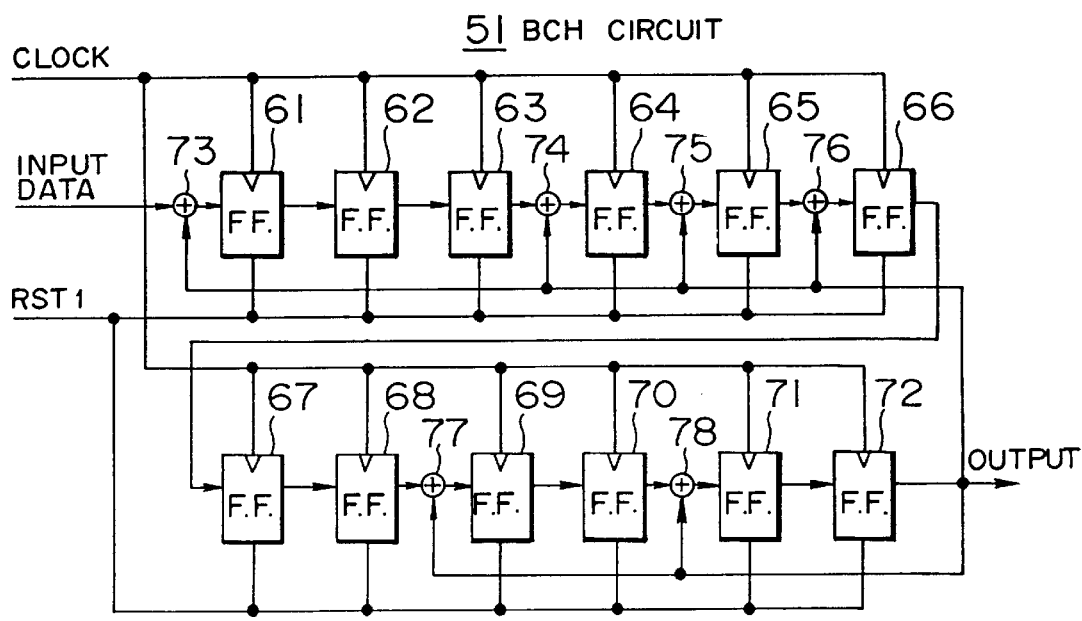
FIG. 9 is a block diagram illustrating the details of the BCH calculating circuit 51.

FIG. 9 shows the detail of the BCH calculating circuit 51 for calculating a BCH-1 code. As shown in this figure, the BCH calculating circuit 51 includes twelve flip-flops (FFs) 61–72 connected in series and six XOR (exclusive OR) gates 73–78 wherein the output of the XOR gate 73 is coupled to the input of the FF 61, the XOR gate 74 is located between the FFs 63 and 64, the XOR gate 75 is located between the FFs 64 and 65, the XOR gate 76 is located between the FFs 65 and 66, the XOR gate 77 is located between the FFs 68 and 69, and the XOR gate 78 is located between the FFs 70 and 71. The 0th bits (Data) are input to one of two input terminals of the XOR gate 73. The output of the flip-flop 72 at the final stage is fed back to the other input terminal of the XOR gate 73. One of two input terminals of each XOR gate 74–78 is connected to the output of the flip-flop preceding each XOR gate, while the other input terminal is connected to the output of the flip-flop 72 at the final stage as in the case of the XOR gate 73.

A clock signal (Clock) is supplied from the timing controller 6 to the clock terminal of each flip-flop 61–72. A reset signal RST1 is supplied from the timing controller 6 to the reset terminal of each flip-flop 61–72.

Upon receiving the reset signal RST1 via the reset terminal, the flip-flops 61–72 clear the values latched therein. Furthermore, if a clock signal is applied to the flip-flops 61–72 after that, the flip-flops 61–72 latch the values applied to the input terminal of the respective flip-flops. Thus the flip-flop 61 latches a 0th bit received via the XOR gate 73, and the flip-flops 62–72 latch the values which have been latched by the preceding flip-flops wherein in the case of the flip-flops 64–66, 69, and 71, the values which have been latched by the flip-flops 63–65, 68, and 70 are transferred via the XOR gates 74–78 to the flip-flops 64–66, 69, and 71, and the transferred values are latched therein.

Therefore, if the output value of the flip-flop 72 at the final stage is 0, the flip-flop 61 latches the 0th bit, and the flip-flops 62–72 latch the values which have been latched by the preceding flip-flops. On the other hand, if the output value of the flip-flop 72 is 1, the flip-flop 61 latches the inverted value of the 0th bit, and the flip-flops 62, 63, 67, 68, 70, and 72 latch the values which have been latched by the respective flip-flops preceding those, that is, the flip-flops 61, 62, 66, 67, 69, and 71, respectively. Furthermore, in this case, the flip-flops 64–66, 69, and 71 latch the inverted values of those which have been latched by the flip-flops 63–65, 68, 70, respectively.

Thus, the flip-flop 72 at the final stage outputs a 12-bit BCH-1 code equal to the remainder obtained when the value represented by the 35 0th bits is divided by the value represented by the following polynomial G(X):

$$G(X)=X^{12}+X^{10}+X^8+X^5+X^4+X^3+1$$

The polynomial G(X) can be represented as the product of two irreducible polynomials of degree six. Therefore, it is possible to correct up to two errors in a series of up to 63 bits.

Figure 10:
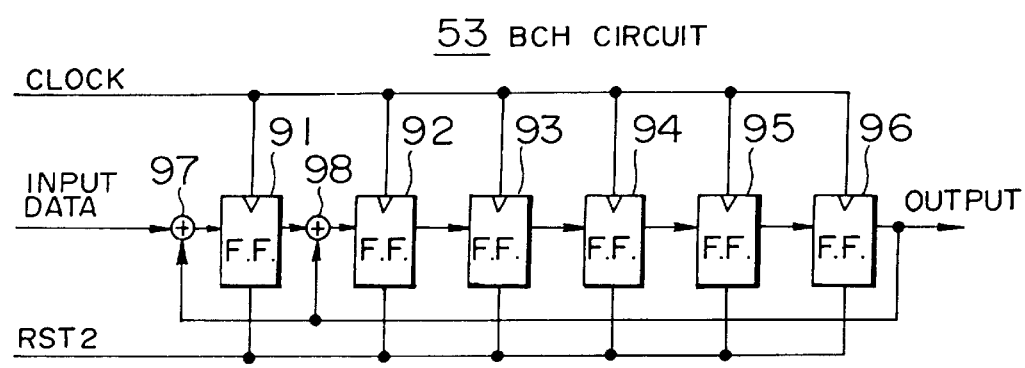
FIG. 10 is a block diagram illustrating the details of the BCH calculating circuit 53.

FIG. 10 illustrates the detail of the BCH calculating circuit 53 for calculating the BCH-2 code. As shown in FIG. 10, the BCH calculating circuit 53 includes six flip-flops 91–96 connected to each other in series wherein an XOR gate 97 is disposed at a stage preceding the first flip-flop 91 and an XOR gate 98 is disposed between the flip-flops 91 and 92. The 1st bits (Data) are applied to one of two input terminals of the XOR gate 97. The output signal of the flip-flop 96 at the final stage is fed back to the other terminal of the XOR gate 97. One of two input terminals of the XOR gate 98 is connected to the output of the preceding flip-flop 91, and the other input terminal is connected to the output of the flip-flop 96 at the final stage as in the XOR gate 97.

A clock signal (Clock) is supplied from the timing controller 6 to the clock terminal of each flip-flop 91–96. A reset signal RST2 is supplied from the timing controller 6 to the reset terminal of each flip-flop 91–96.

Upon receiving the reset signal RST2 via the reset terminal, the flip-flops 91–96 clear the values latched therein. Furthermore, if a clock signal is applied to the flip-flops 91–96 after that, the flip-flops 91–96 latch the values applied to the input terminal of the respective flip-flops. Thus, the flip-flop 91 latches a 1st bit received via the XOR gate 97, and the flip-flops 92–96 latch the values which have been latched by the respective flip-flops preceding those flip-flops wherein in the case of the flip-flop 92 it latches the value received from the flip-flop 91 via the XOR gate 98.

Therefore, if the output value of the flip-flop 96 at the final stage is 0, the flip-flop 91 latches the 1st bit, and the flip-flops 92–96 latch the values which have been latched by the preceding flip-flops 91–95. On the other hand, if the output value of the flip-flop 96 is 1, the flip-flop 91 latches the inverted value of the 1st bit, and the flip-flops 93–96 latch the values which have been latched by the respective flip-flops preceding the flip-flops 92–95. Furthermore, in this case, the flip-flop 92 latches the inverted value of that which has been latched by the flip-flop 91.

Thus, the flip-flop 72 at the final stage outputs a 6-bit BCH-2 code equal to the remainder obtained when the value represented by the 41 1st bits is divided by the value represented by the following polynomial G(X):

$$G(X)=X^6+X+1$$

The polynomial G(X) is an irreducible polynomial of degree six. Therefore, it is possible to correct one error in a series of up to 63 bits.

Figure 11:
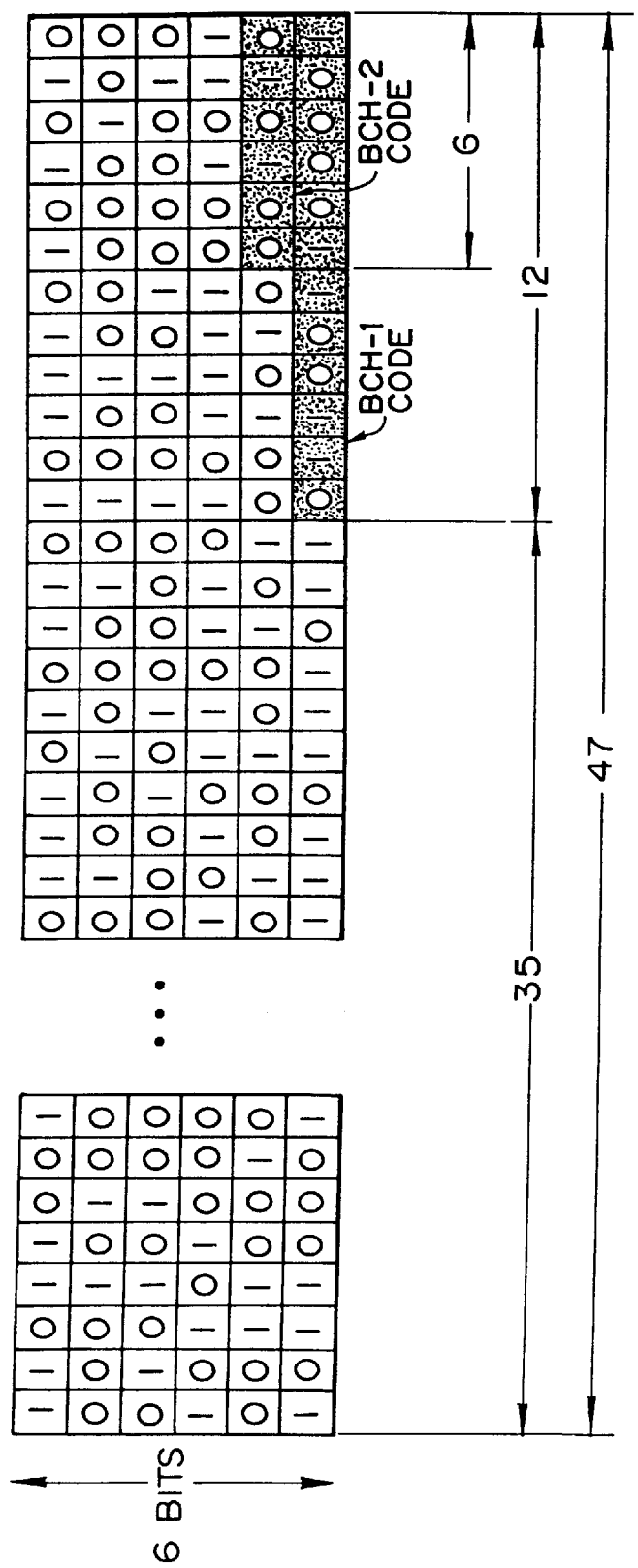
FIG. 11 is a schematic representation of a format of data output from the error correcting circuit 4.

As described above, the error correcting circuit 4 calculates the BCH-1 and BCH-2 codes and the resultant codes are placed at the 0th and 1st bits in blank parts of the data shown in FIG. 5. As a result, the data have a complete form of a 6 bits×47 rows matrix as shown in FIG. 11. Hereinafter, this 6 bits×47 rows matrix will be referred to as a block.

The timing controller 6 outputs a control signal to the switch 5 for a time period until a fixed pattern is generated by the fixed pattern generator 7 after one block of data has been output from the error correcting circuit 4. The switch (data selector) 5 selects the output terminal of the fixed pattern generator for the time period during which the control signal generated by the timing controller 6 is applied to the switch 5, while the switch 5 selects the output terminal of the error correcting circuit 4 for the other time period.

In this way, one block of data is supplied from the error correcting circuit 4 to the edge modulating circuit 8 via the switch 5, and a fixed pattern is then supplied from the fixed pattern generator 7 to the edge modulating circuit 8 via the switch 5.

Figure 12:
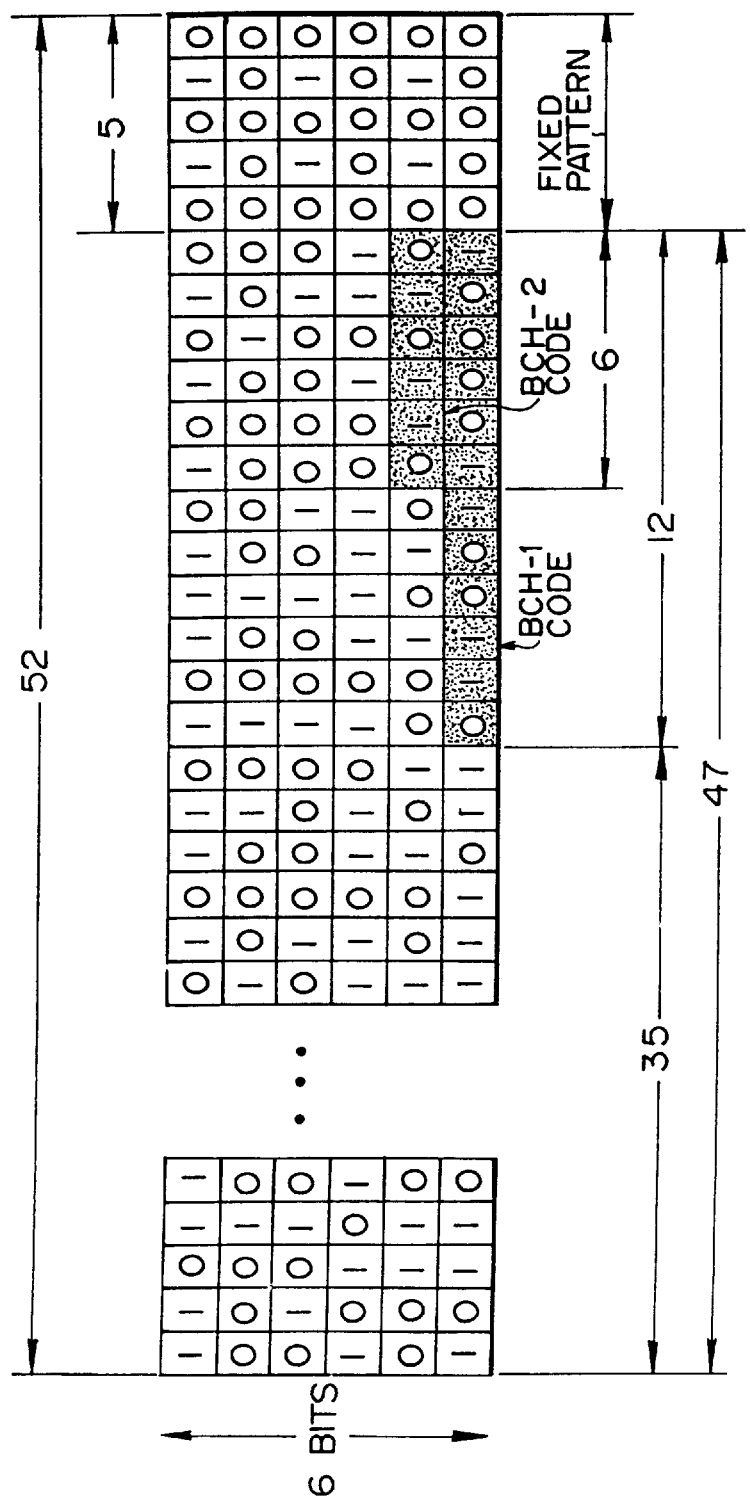
FIG. 12 is a schematic representation of data obtained by adding a fixed pattern generated by a fixed pattern generator 7 to the data shown in FIG. 11.

The term "fixed pattern" is used here to refer to a fixed pattern consisting of for example 6 bits×5 rows which is used to extract a clock signal and also used to eliminate bias or gain disturbances which occur in an optical disk system. Thus, a series of data is applied to the edge modulating circuit 8 wherein each unit of data consists of a matrix of 6 bits×52 rows (=47 rows+5 rows) as shown in FIG. 12.

The data consisting of 6 bits×52 rows are applied row by row to the edge modulating circuit 8. The edge modulating circuit 8 generates a signal corresponding to each 6-bit row of the data and outputs the resultant signal to a mastering machine (cutting machine) which in turn forms a pit on an optical disk so that the edge position is changed according to the signal given from the edge modulating circuit 8.

Figure 13:
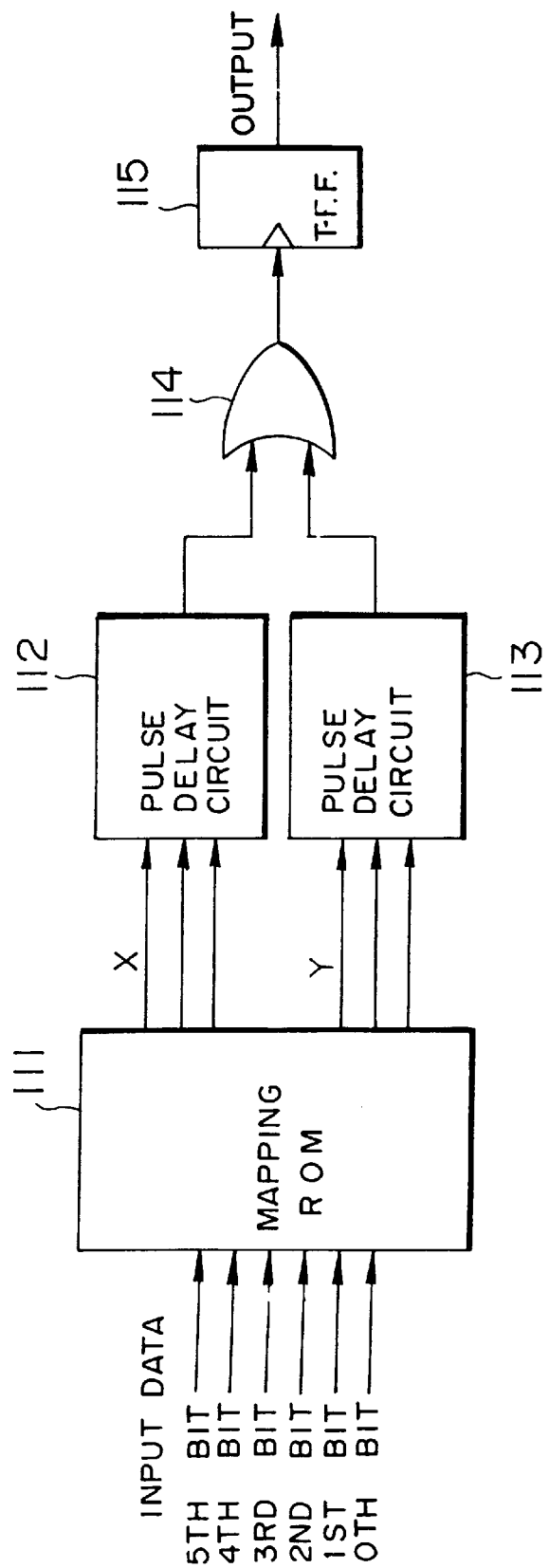
FIG. 13 is a block diagram illustrating the details of an edge modulating circuit 8.

FIG. 13 illustrates in detail the edge modulating circuit 8. As shown in FIG. 13, the edge modulating circuit 8 includes a mapping ROM 111, pulse delay circuits 112 and 113, an OR gate 114, and a T-type flip-flop (T-FF) 115.

The mapping ROM 111 has an address space of 6 bits wherein position information X associated with the rising (leading) edge of a pit and position information Y associated with the falling (trailing) edge of the pit are stored in memory space at each address. The position of each edge of a pit can be varied in a discrete fashion within the range including eight (=$2^3$) discrete positions corresponding to eight values from 0 to 7. Therefore, each position information X and Y consists of 3-bit information representing a value in the range from 0 to 7.

In response to 6-bit data given as an address to the mapping ROM 111, the mapping ROM 111 outputs 3-bit position information X and Y. This means that the mapping ROM 111 performs a one-to-one conversion and thus the quantity of information remains unchanged.

The position information X and Y output from the mapping ROM 111 are applied to the pulse delay circuit 112 and 113, respectively. The pulse delay circuits 112 and 113 generate a pulse whose phase is delayed by an amount corresponding to the received position information X and Y, respectively.

Figure 14A:
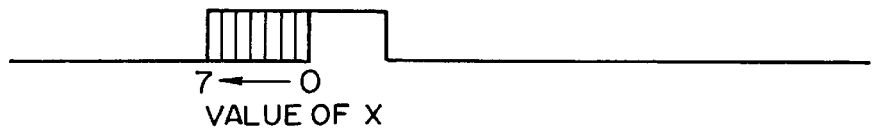
FIG. 14 is a schematic representation of the operation of the edge modulating circuit 8 shown in FIG. 13.

That is, the pulse delay circuit 112 generates a pulse whose position of the rising edge is delayed from the rising edge of a predetermined reference pulse by an amount corresponding to the position information X. More specifically, the edge of the pulse rises at an earlier position with the increase in the value of the position information X or at a later position with the decrease in the value of the position information X as shown in FIG. 14A.

Figure 14B:
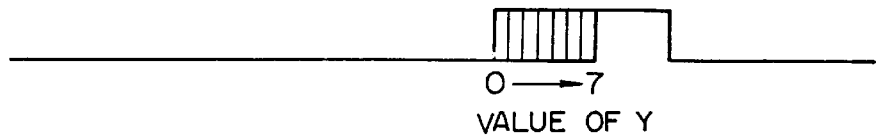

On the other hand, the pulse delay circuit 113 generates a pulse whose rising edge is delayed from the predetermined reference pulse by an amount corresponding to the position information wherein the amount of the delay has an opposite polarity to that given by the above-described pulse delay circuit 112. More specifically, the edge of the pulse rises at a later position with the increase in the value of the position information Y or at an earlier position with the decrease in the value of the position information Y as shown in FIG. 14B.

Figure 14C:
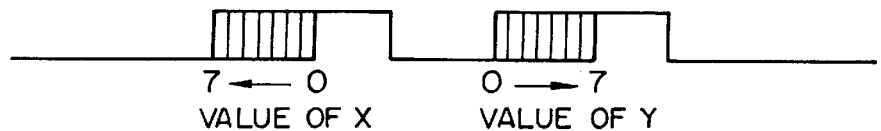

The pulses generated by the pulse delay circuits 112 and 113 are supplied to the OR gate 114. The OR gate 114 determines the logical OR between the pulses output from the pulse delay circuits 112 and 113, and the result is supplied to the T-type flip-flop 115. Thus, the T-type flip-flop 115 receives the pulses shown in FIG. 14C which are the result of the logical OR operation between the pulse shown in FIG. 14A and the pulse shown in FIG. 14B.

Figure 14D:
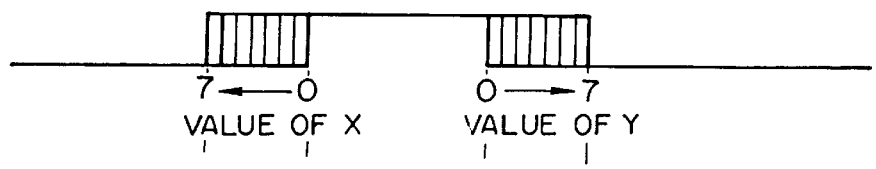
Figure 14E:
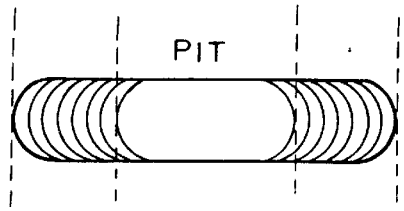

In response to each rising edge of the pulse input to the T-type flip-flop 115, the output of the T-type flip-flop 115 is inverted. Therefore, when the pulses shown in FIG. 15C are applied to the T-type flip-flop 115, a pulse such as that shown in FIG. 14D is output from the T-type flip-flop 115 wherein its rising and falling edges are varied according to the position information X and Y, respectively. That is, the rising and falling edges are modulated relative to the reference pulse.

The pulse output from the T-type flip-flop 115 is applied to a mastering machine. The mastering machine modulates the optical beam (in an on-off fashion) according to the pulse received from the edge modulating circuit 8 thereby forming a pit (or a protrusion) whose rising and falling edges are shifted in a discrete fashion by an amount corresponding to the position information X and Y, respectively. The mastering machine periodically forms a great number of pits in a similar manner.

In this way, the mastering machine produces an optical-disk master. A stamper is then produced via developing and other processes in a similar manner to the CD (compact disk). A great number of copies, or optical disks, are produced using this stamper.

In this technique, the edge position of the pit is shifted within a predetermined shifting period smaller than the rising time or falling time, or the transient period of the reproduction signal wherein the transient period depends on the transfer characteristic of a reproducing optical system via which the information recording medium is scanned with a light beam thereby reproducing the signal corresponding to the pits.

Figure 15:
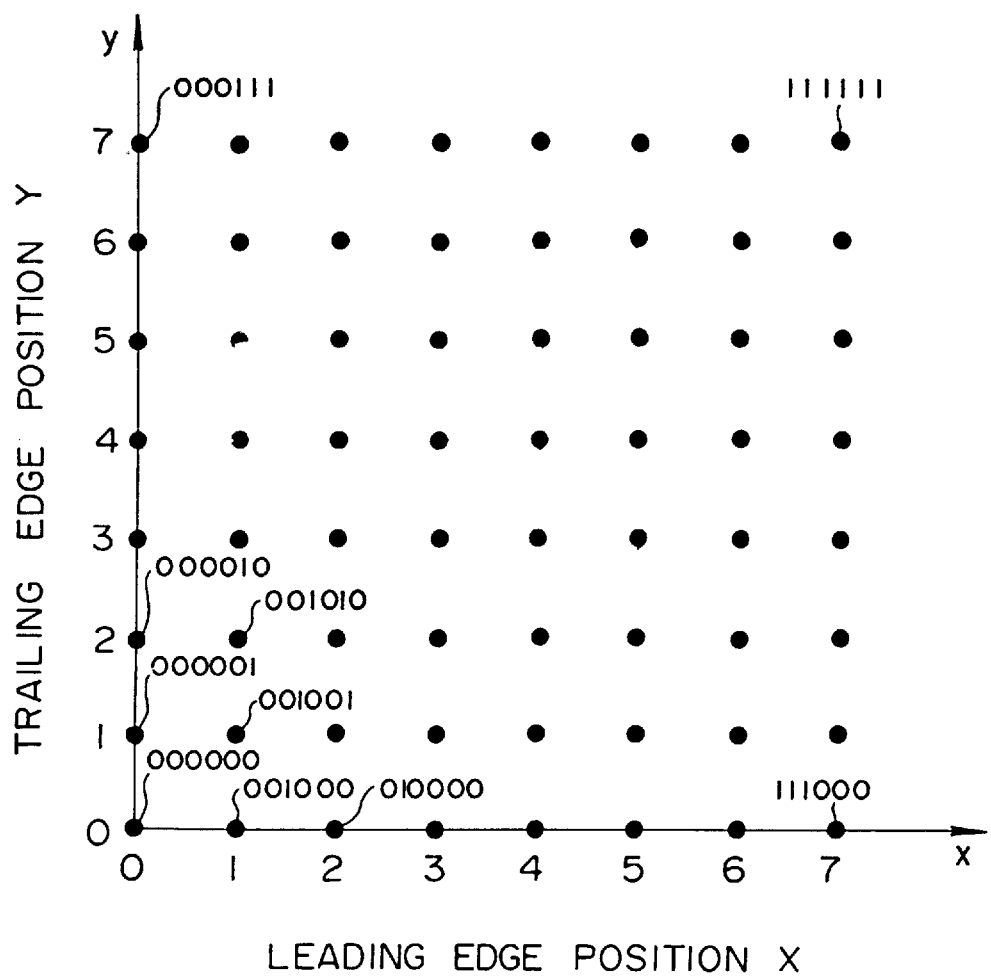
FIG. 15 is a diagram of a two-dimensional plane having X and Y axes on which position information X and Y are plotted.

The mapping ROM 111 of the edge modulating circuit 8 will be described in further detail below. As described earlier, the mapping ROM 111 converts 6-bit data into position information X and Y each consisting of 3 bits which represent the position of the leading and trailing edges, respectively. Since each of the position information X and Y has a value in the range from 0 to 7, the position information X and Y can be represented by a coordinate point plotted on a two-dimensional plane wherein the position information X is represented by an X coordinate and the position information Y is represented by a Y coordinate as shown in FIG. 15. In FIG. 15, coordinate points at which the position information X and Y can be plotted are represented by solid circles.

If 64 (=8×8) coordinate points (information points) shown in FIG. 15 are assigned 6-bit binary numbers, 6-bit binary data are defined in relation to 3-bit position information X and Y. Therefore, the mapping ROM 111 may be implemented by storing X and Y coordinates of coordinate points at addresses corresponding to the 6-bit binary numbers assigned to the coordinate points.

Figure 16:
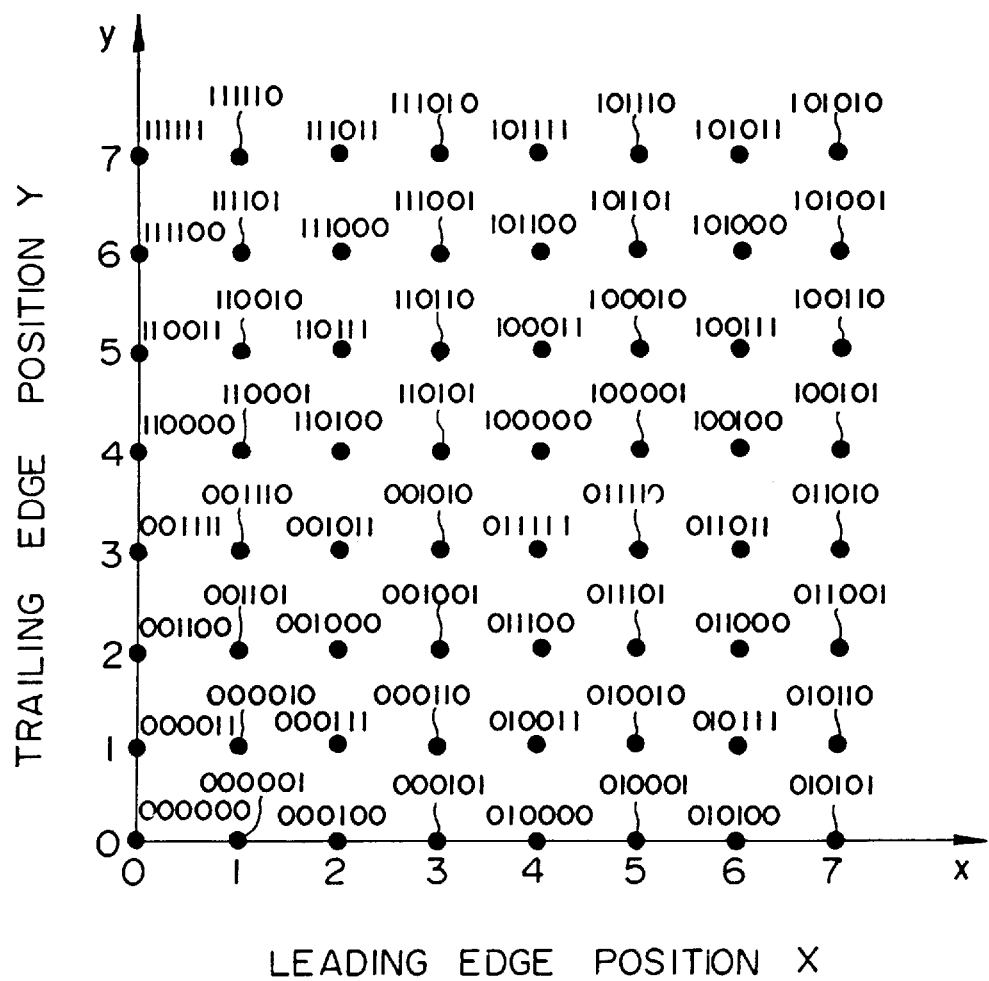
FIG. 16 is a diagram illustrating coordinate points plotted on the two-dimensional plane shown in FIG. 15, wherein 6-bit binary numbers are assigned to the coordinate points.
Figure 17A:
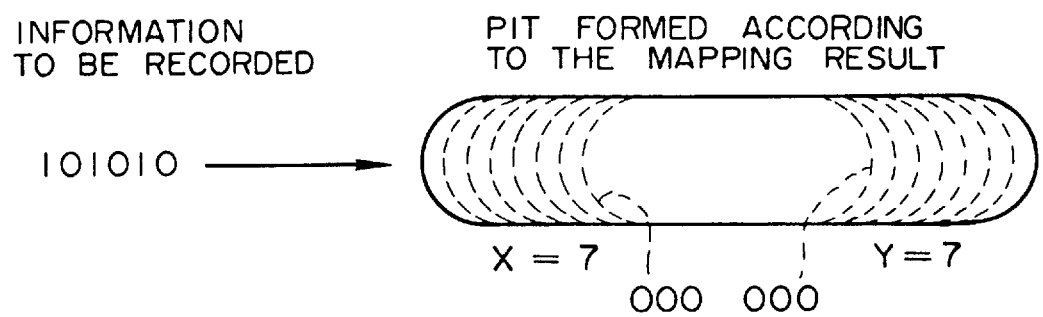
FIG. 17 is a schematic diagram illustrating pits formed according to the relationship between the binary number and the coordinate point defined in FIG. 16.
Figure 17B:
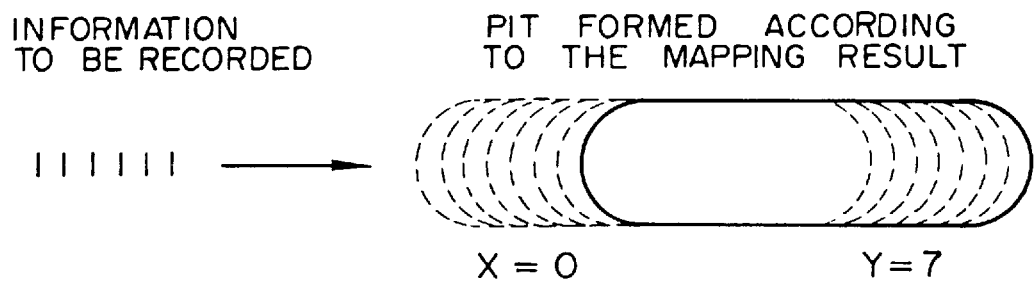

The manner in which the coordinate points are assigned 6-bit binary numbers will be described below. One way of assigning 6-bit binary numbers to 64 coordinate points is to assign 000000, 000001, . . . , 000111 to the coordinate points along the line extending from the origin (0, 0) in the Y direction, 001000, 001001, . . . , 001111 to the coordinate points along the line extending from point (1, 0) in the Y direction, and so on, as shown in FIG. 15. FIG. 16 shows another way of assigning 6-bit binary numbers to the coordinate points, which is employed in this embodiment.

If 6-bit binary numbers are assigned to 64 coordinate points in the manner shown in FIG. 16, for example 101010 is assigned to a coordinate point (7, 7). Therefore, when data 101010 is recorded as a pit by the information recording apparatus shown in FIG. 3, the pit representing the data 101010 has a leading edge located at the extreme forward position and a trailing edge located at the extreme backward position. On the other hand, 111111 is assigned to the coordinate point (0, 7) and thus a pit corresponding to 111111 has a leading edge located at the extreme backward position and a trailing edge located at the extreme backward position.

The assignment shown in FIG. 16 may be performed as follows. First, as shown in FIG. 18, 64 coordinate points are divided into two groups so that, of the 64 points, any coordinate points nearest to each other are separated into different groups.

Figure 18:
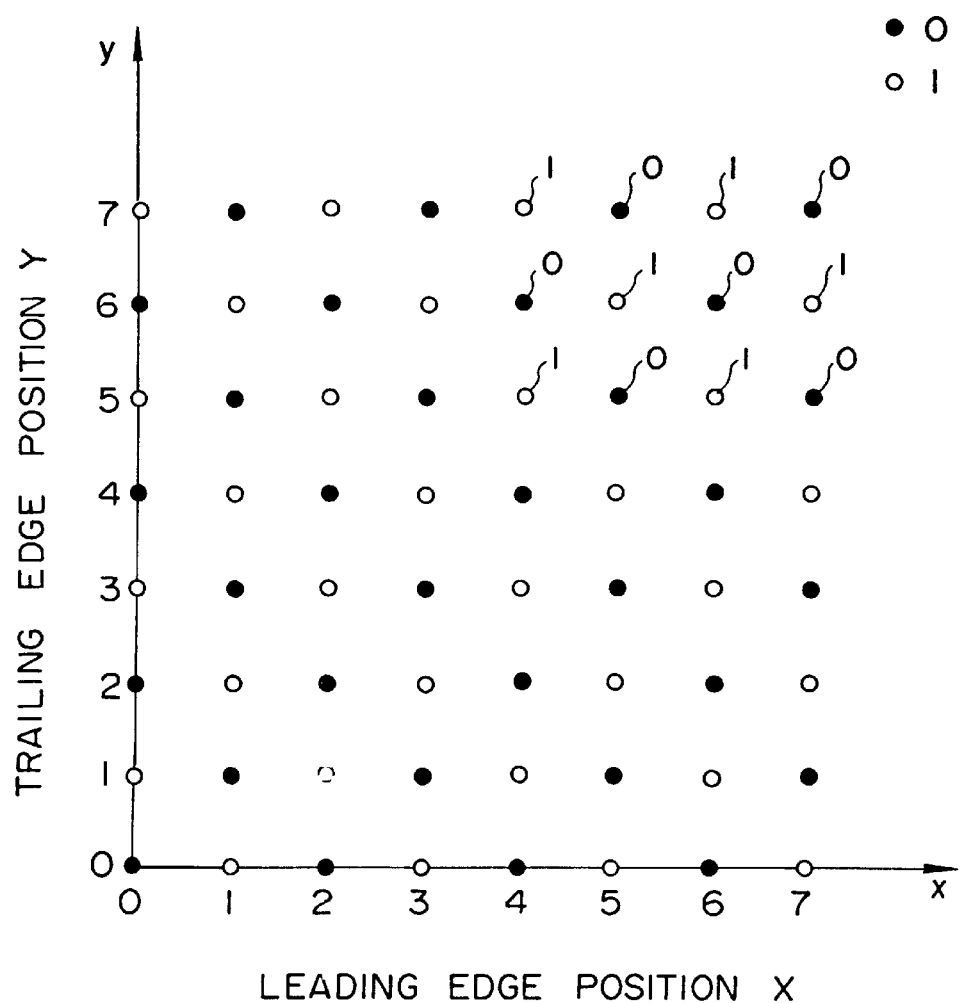
FIG. 18 is a diagram illustrating a method of implementing the assignment of the binary numbers to the coordinate points shown in FIG. 16.

In FIG. 18, the coordinate points belonging to one group are each denoted by an open circle, while those belonging to the other group are each denoted by a solid circle. As can be seen from FIG. 18, any coordinate points nearest to an arbitrary solid circle are an open circle.

Then, 6-bit binary numbers are mapped to coordinate points on the basis of the value of a certain bit (it is assumed here that the 0th bit or LSB is employed in this embodiment) of each 6-bit binary number in such a manner that binary numbers whose 0th bit is 0 are assigned to coordinate points in one group and those whose 0th bit is 1 are assigned to coordinate points in the other group.

In the example shown in FIG. 18, the binary numbers whose 0th bit is 1 are assigned to the coordinate points in the group denoted by open circles and those whose 0th bit is 0 are assigned to the coordinate points in the group denoted by solid circles.

Furthermore, the coordinate points belonging to each group denoted by open or solid circles are further divided into two subgroups so that any coordinate points nearest to each other are separated into different subgroups, and then 6-bit binary numbers are mapped to the coordinate points in each subgroup on the basis of the value of for example 1st bit.

Figure 19:
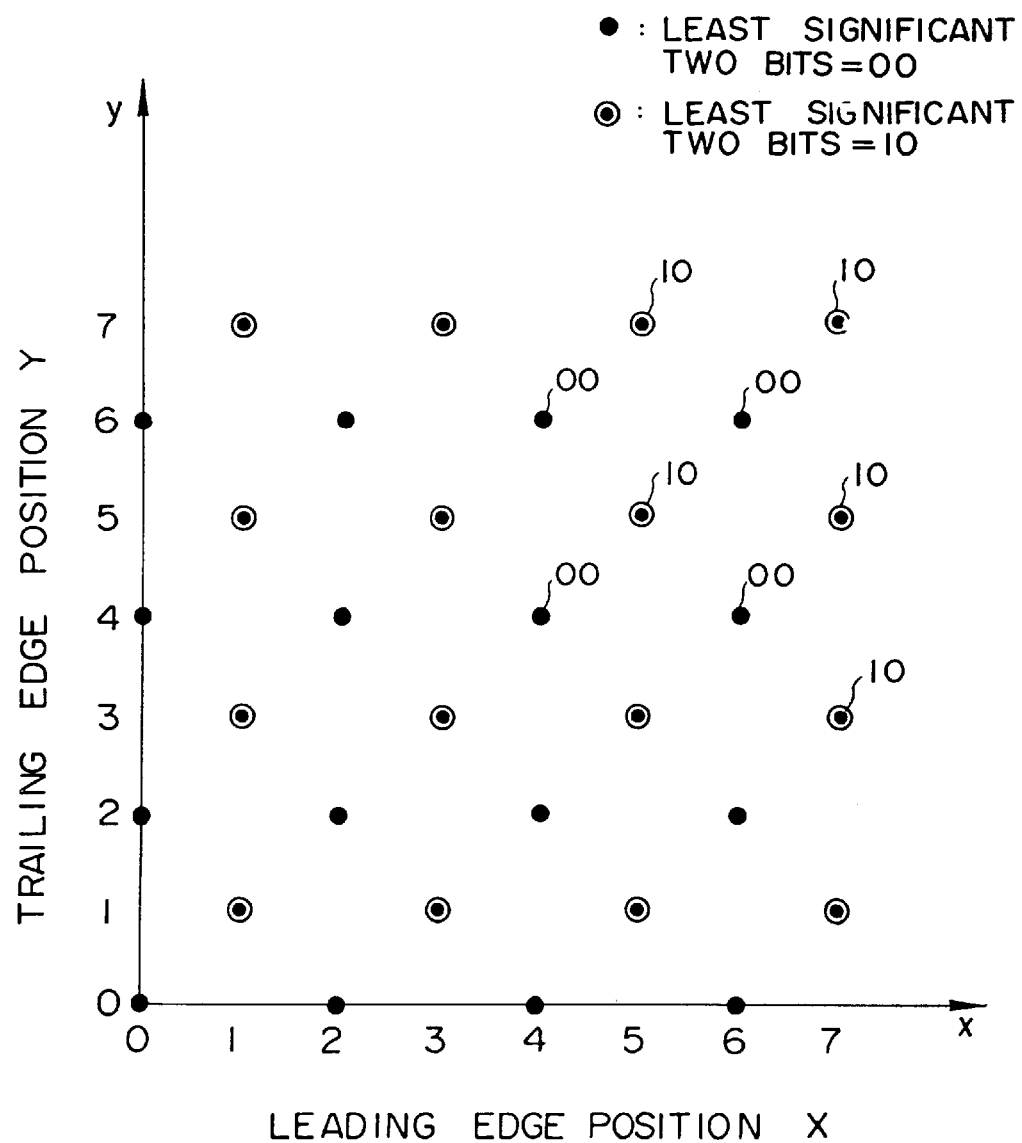
FIG. 19 is a diagram illustrating a method of implementing the assignment of the binary numbers to the coordinate points shown in FIG. 16.

In the example shown in FIG. 19, the coordinate points belonging to the solid-circle group shown in FIG. 18 are divided into two groups so that any coordinate points of these nearest to each other are separated into different groups. In FIG. 19, the coordinate points belonging to one group are each denoted by a solid circle surrounded by an open circle, while the coordinate points belonging to the other group are each denoted by a simple solid circle. Furthermore, in the example shown in FIG. 19, the mapping is performed so that binary values whose 1st bit is 1 are assigned to the coordinate points denoted by a solid circle surrounded by an open circle and binary numbers whose 1st bit is 0 are assigned to the coordinate points denoted by a simple solid circle. This means that the coordinate points denoted by a simple solid circle are assigned binary numbers whose 0th and 1st bits are 0, and the coordinate points denoted by a solid circle surrounded by an open circle are assigned binary values whose 0th bit is 0 and 1st bit is 1.

If mapping is performed further in a similar manner on the basis of the value of the respective remaining bits from 2nd to 5th bits, all coordinate points are finally mapped as shown in FIG. 16 (and thus a corresponding mapping table is obtained).

Figure 20:
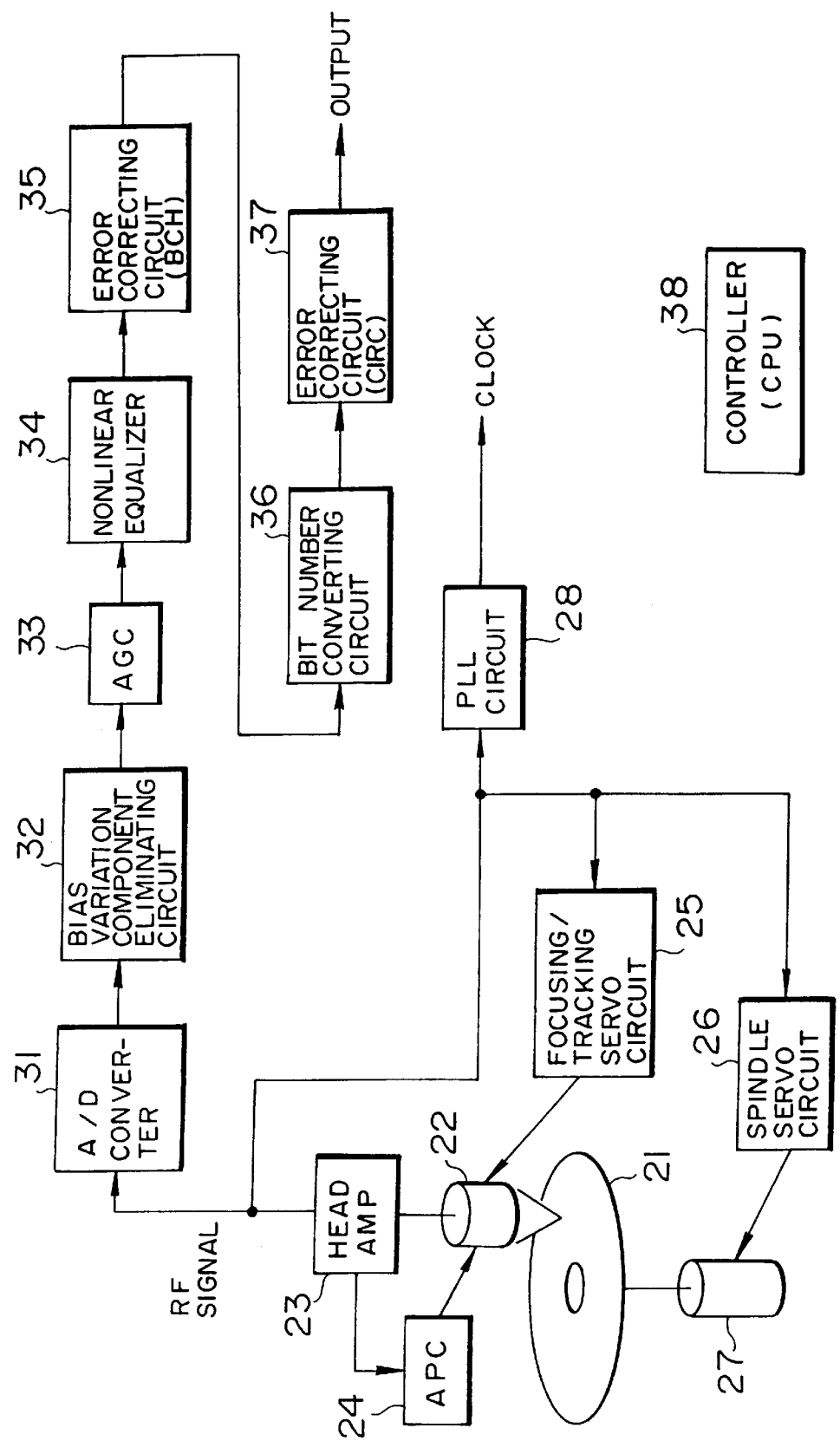
FIG. 20 is a block diagram of an embodiment of an optical disk apparatus according to the present invention.

FIG. 20 illustrates an embodiment of an optical disk apparatus for reproducing digital information from an optical disk on which pits representing information are formed by the information recording apparatus shown in FIG. 3.

In FIG. 20, an optical disk 21 stores digital information which has been recorded thereon using the information recording apparatus shown in FIG. 3. Under the control of a focusing/tracking servo control circuit 25, a pick-up 22 emits a light beam so that a proper track on the optical disk 21 is illuminated by the light beam, and the pick-up 22 detects the light reflected from the optical disk 21. Furthermore, the pick-up 22 outputs an RF signal (reproduction signal) corresponding to the intensity of the detected light. A head amplifier 23 amplifies the RF signal received from the pick-up 22, and supplies the amplified signal to an APC (auto power control) circuit 24, the focusing/tracking servo control circuit 25, a spindle servo control circuit 26, a PLL circuit 28, and an analog-to-digital converter 31.

In response to the RF signal supplied from the head amplifier 23, the APC circuit 24 controls the intensity of the light beam emitted by the pick-up 22. The focusing/tracking servo control circuit 25 controls the focusing and tracking operations associated with the pick-up 22 by means of the servo technique on the basis of the RF signal received from the head amplifier 23. The spindle servo control circuit 26 controls the speed of rotation of the spindle motor 27 on the basis of the RF signal received from the head amplifier 23. Under the control of the spindle servo control circuit 26, the spindle motor 27 rotates the optical disk 21 at a predetermined rotational speed. The PLL circuit 28 extracts a clock pattern from the RF signal received from the head amplifier 23 and generates a clock signal which is supplied to various blocks over the entire apparatus so that the clock signal is used as a timing reference in the operations of these blocks.

In response to the clock signal (A/D conversion clock signal) supplied from the PLL circuit 28, the analog-to-digital converter 31 samples the RF signal received from the head amplifier 23 and converts it into a digital signal. The resultant digital signal is supplied to a bias variation eliminating circuit 32. The bias variation eliminating circuit 32 extracts a fixed pattern (a pattern used for eliminating a bias variation component) from the RF signal received from the analog-to-digital converter 31 and eliminates the bias variation component from the RF signal on the basis of the fixed pattern. The resultant signal is supplied to an AGC circuit 33. The AGC circuit 33 eliminates the gain variation component from the RF signal received from the bias variation eliminating circuit 32 on the basis of a fixed pattern (a pattern used for eliminating the gain variation component). The resultant signal is then supplied to a nonlinear equalizer 34.

The nonlinear equalizer 34 eliminates intersymbol interference from the RF signal received from the AGC circuit 33 and supplies the resultant signal to an error correcting circuit 35. The error correcting circuit 35 decodes the signal received from the nonlinear equalizer 34 into a reproduction signal and corrects an error in the decoded signal mainly due to the level variation or noise in the RF signal using the above-described BCH-1 and BCH-2 codes. The resultant signal is then supplied to a unit-data-length conversion circuit 36. The decoded signal output from the error correcting circuit 35 has a structure in a 6-bit format. On the other hand, an error correcting circuit 37 at the following stage performs error correction in units of 8 bits. Thus, the signal in the 6-bit format is converted into a 8-bit format by the unit-data-length conversion circuit 36 and supplied to the error correcting circuit 37. The unit-data-length conversion circuit 36 may be implemented for example with four 6-bit flip-flops so that a 24-bit decoded signal in the 6-bit format is latched by these flip-flops and converted into a signal consisting of three 8-bit data.

The error correcting circuit 37 detects and corrects an error, caused mainly by defects, in the decoded signal in the 8-bit format supplied from the unit-data-length conversion circuit 36 using the above-described CIRC. A controller 38 constructed for example with a CPU, ROM, RAM, and other components controls the blocks of the apparatus.

The operation of the present embodiment of the optical disk apparatus will be described in detail below. If a command to start a reproduction operation is issued to the controller 38 by a user via an operation part (not shown), the controller 38 rotates the optical disk 21 via the spindle motor 27 and makes the pick-up 22 emit a light beam. The light beam emitted by the pick-up 22 illuminates the optical disk 21. The light beam is reflected from the optical disk 21. The reflected light is detected by the pick-up 22. The pick-up 22 outputs an RF signal corresponding to the intensity of the reflected light. The RF signal is applied to the amplifier 23. The head amplifier 23 amplifies the RF signal received from the pick-up 23. The amplified RF signal is supplied to the APC circuit 23, the focusing/tracking servo control circuit 25, the spindle servo control circuit 26, the PLL circuit 28, and the analog-to-digital converter 31.

The APC circuit 24 controls the intensity of the light beam emitted by the pick-up 22 according to the RF signal received from the head amplifier 23 so that the optical disk 21 is illuminated by the light beam having a fixed intensity. The focusing/tracking servo control circuit 25 performs focusing servo control and tracking servo control associated with the pick-up 22 according to the RF signal received from the head amplifier 23 so that the light beam is focused on the surface of the optical disk 21 and a predetermined track is illuminated by the light beam. In response to the RF signal output from the head amplifier 23, the spindle servo control circuit 26 control the rotational speed of the spindle motor 27 so that the optical disk 21 rotates at the predetermined speed.

The PLL circuit 28 generates a clock signal from the RF signal received from the head amplifier 23 and supplies the resultant clock signal to various blocks of the apparatus so that these blocks operate in synchronization with the clock signal. In response to the clock signal supplied from the PLL circuit 28, the analog-to-digital converter 31 samples the RF signal received from the head amplifier 23.

Figure 21:
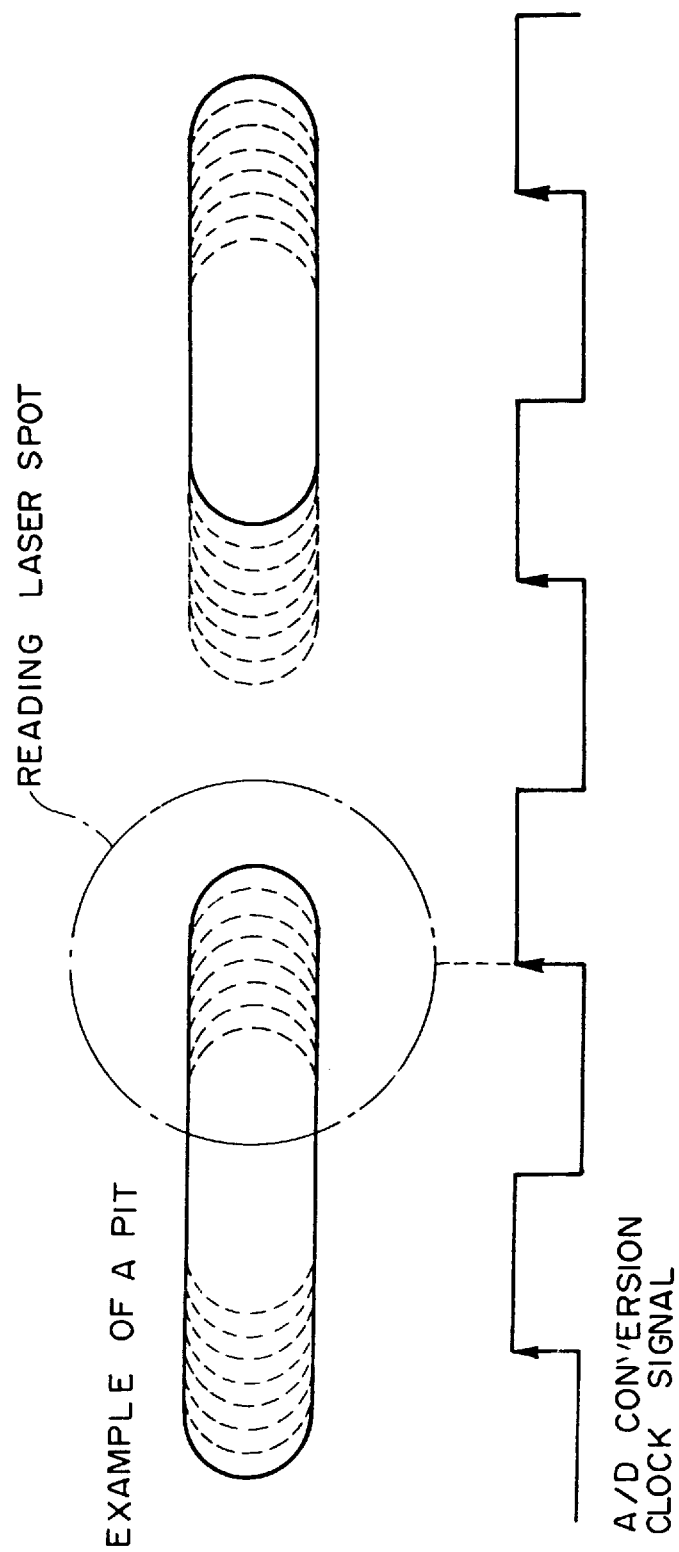
FIG. 21 is a schematic representation illustrating the operation of an analog-to-digital converter 31.

FIG. 21 illustrates the sampling operation performed by the analog-to-digital converter 31. As shown in FIG. 21, the rising edge of the A/D conversion clock signal supplied from the PLL circuit 28 is situated at the center of the range within which pit edge position varies. The analog-to-digital converter 31 detects the rising edge of the clock signal thereby recognizing the time at which an optical spot projected onto the optical disk 21 strikes the central position of the range within which the pit edge position varies. Thus, the analog-to-digital converter 31 samples the RF signal received from the head amplifier 23 in synchronization with each rising edge of the clock signal. The RF signal obtained at the rising or falling edge of each pit varies among the eight discrete levels depending on the position information X and Y as described above.

The RF signal which has been sampled and converted into a digital signal by the analog-to-digital converter 31 is applied to the nonlinear equalizer 34 via the bias variation eliminating circuit 32 and the AGC circuit 33.

The RF signal reproduced from the optical disk contains bias variation and gain variation components. In other words, there are fluctuations in the RF signal. The bias variation eliminating circuit 32 and the AGC circuit 33 eliminate the bias variation and gain variation components, respectively, on the basis of the fixed pattern contained in the RF signal.

The nonlinear equalizer 34 eliminates intersymbol interference from the RF signal received from the AGC circuit 33 and supplies the resultant signal to the error correcting circuit 35.

The RF signal supplied to the error correcting circuit 35 includes signal values (sampled values) VX and VY obtained at the rising edge and the falling edge of a pit, respectively, wherein the sampled values VX and VY correspond to the position information X and Y, respectively, and can be represented by the following equations:

$VX = K \times X + C$ $VY = K \times Y + C$ where C is a constant representing the bias component which depends on the bias variation eliminating process performed by the bias variation eliminating circuit 32, and K is a constant representing the gain depending on the gain variation eliminating process performed by the AGC circuit 33.

Figure 22:
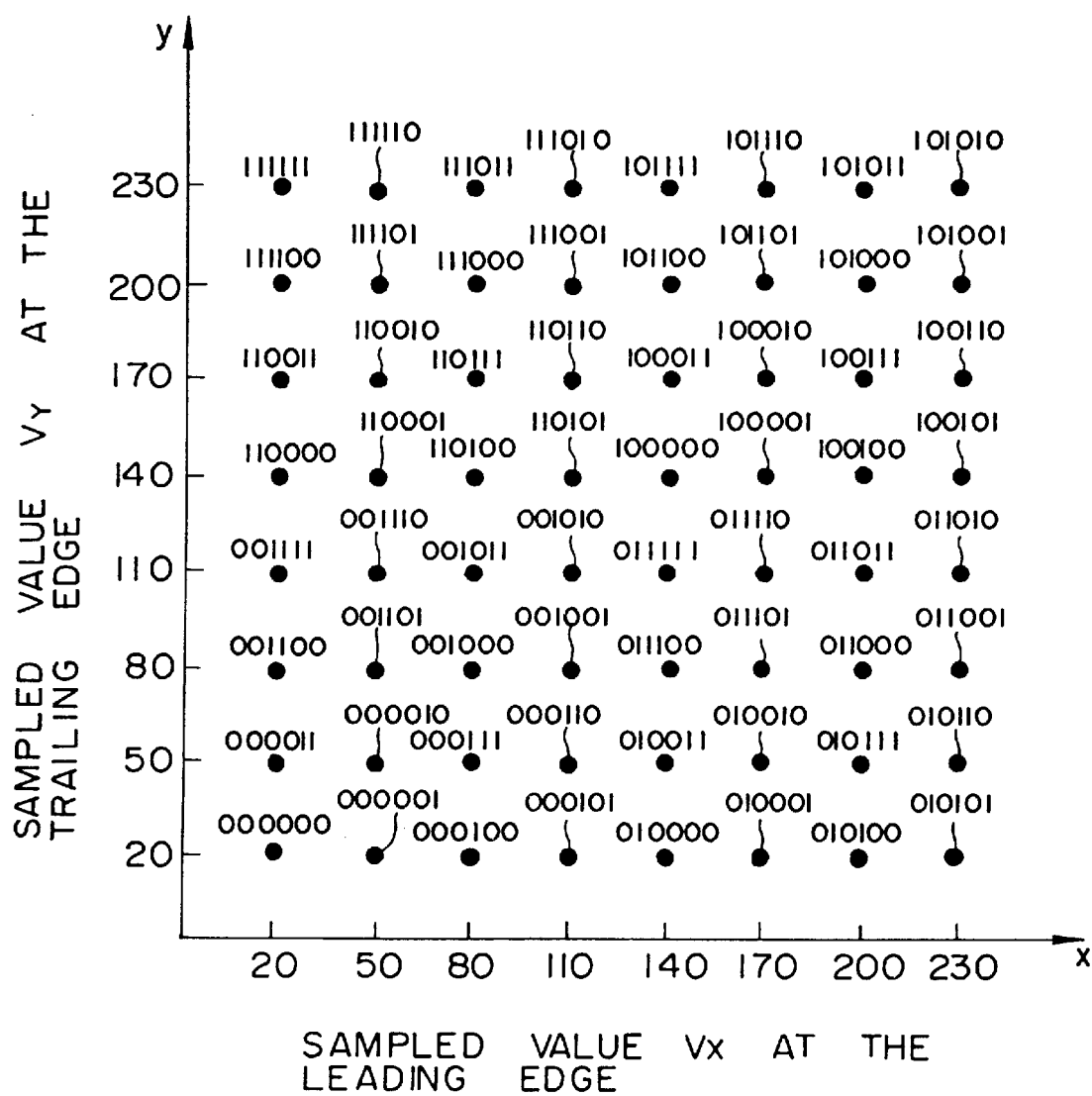
FIG. 22 is a diagram illustrating a two-dimensional plane on which ideal sample values (VX, VY) input to an error correcting circuit 35 are plotted.

If it is assumed here that the bias variation eliminating circuit 32 and the AGC circuit 33 are designed so that K is equal to for example 30 and C is equal to for example 20, and if the sampled values VX and VY are combined together and represented as a point (VX, VY) in a two-dimensional XY plane, then the point (VX, VY) can, ideally, be plotted on some coordinate point (denoted by a solid circle) in the two-dimensional plane shown in FIG. 22. In FIG. 22, a binary number shown above each coordinate point denotes the decoded value corresponding to that coordinate point wherein the correspondence between the coordinate point and the decoded value is the same as that in FIG. 14.

In practice, however, the RF signal includes noise due to various causes, and thus the actual sampled value (VX, VY) is plotted at a point deviating from the ideal point. However, the noise level is usually much lower than the RF signal level, and therefore the probability that the sample point (VX, VY) deviates from its ideal coordinate point to a great extent is low. This means that the probability that the noise causes the sample point (VX, VY) which should be plotted at the coordinate point (20, 20) to deviate in an oblique direction to a point near the coordinate point (50, 50) is lower than the probability that the sample point is deviated in the Y or X direction to the adjacent coordinate point (20, 50) or (50, 20). The probability that the sample point is deviated to the coordinate point (20, 80) or (80, 20) is lower than the probability that the sample point is deviated to the coordinate point (50, 50).

Taking into the account the above fact regarding the level fluctuation in the RF signal due to noise, the error correcting circuit 35 shown in FIG. 20 is designed to detect an error due to noise and correct it with a small amount of redundancy without a significant reduction in the storage capacity of the optical disk 21.

Figure 23:
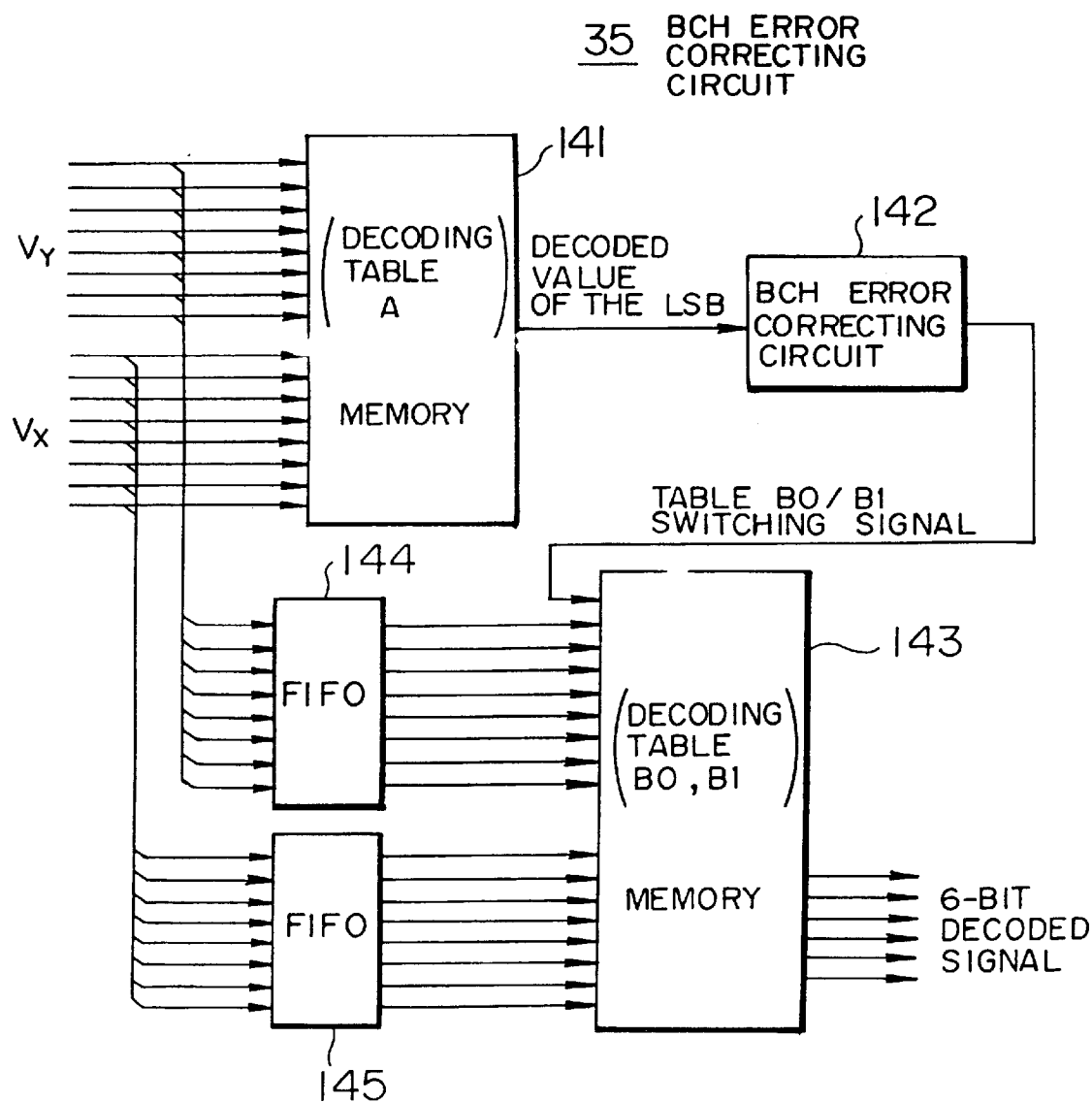
FIG. 23 is a block diagram illustrating the details of the error correcting circuit 35.

FIG. 23 illustrates the detail of the error correcting circuit 35. As shown in FIG. 23, the error correcting circuit 35 includes a memory 141, a BCH error correcting circuit 142, a memory 143, and FIFOs 144 and 145. The memory, such as a ROM, 141 stores a decoding table A which will be described in detail later. The memory 141 decodes the bit, on which the first mapping is performed, from a sampled values VX and VY given as an address using the decoding table A, that is, the memory 141 decodes the 0th bit (LSB) of each 6-bit data of a block shown in FIG. 11.

Ideally, the sampled values VX and VY are in the range from 20 to 230 as shown in FIG. 22. Therefore, it is reasonable to assume that the actual sampled values VX and VY are within the range from 0 to 256 (=$2^8$). Thus, in this embodiment, the sampled values VX and VY are represented by 8-bit digital data, respectively, and applied to the memory 141. This means that the memory 141 has a 16 (=8+8) bit address space.

The BCH error correcting circuit 142 performs error correction on the 0th bit of the decoded value supplied from the memory 141 on the basis of the BCH code. As shown in FIG. 11, the 0th bits in one block of data include a 12-bit BCH-1 code. This 12-bit BCH-1 code is used in the above-described error correcting process for the 0th bits. Furthermore, in response to the result of the error correcting process for the 0th bits, the BCH error correcting circuit 142 generates a switching signal for switching tables B0 and B1 which will be described later, wherein the switching signal is supplied to the memory 143.

The FIFOs 144 and 145 temporarily store the sampled values VX and VY, respectively, and supply the stored values to the memory 143 after a predetermined delay time has elapsed. The memory, such as a ROM, 143 stores the decoding tables B0 and B1 which will be described in detail below. The memory 143 selects either the decoding table B0 or B1 according to the switching signal received from the BCH error correcting circuit 142, and decodes the sampled values VX and VY given as the addresses into 6-bit data such as that shown in FIG. 11.

The operation of the error correcting circuit 35 will be described in further detail below. The 8-bit sampled values VX and VY output from the nonlinear equalizer 34 shown in FIG. 20 are stored as a 16-bit address into the memory 141. The 8-bit sampled values VX and VY are also supplied to the FIFOs 144 and 145, respectively, and temporarily stored therein.

Using the decoding table A stored in the memory 141, the memory 141 reproduces the 0th bit value of the 6-bit data from the sampled values VX and VY given as the address.

Figure 24:
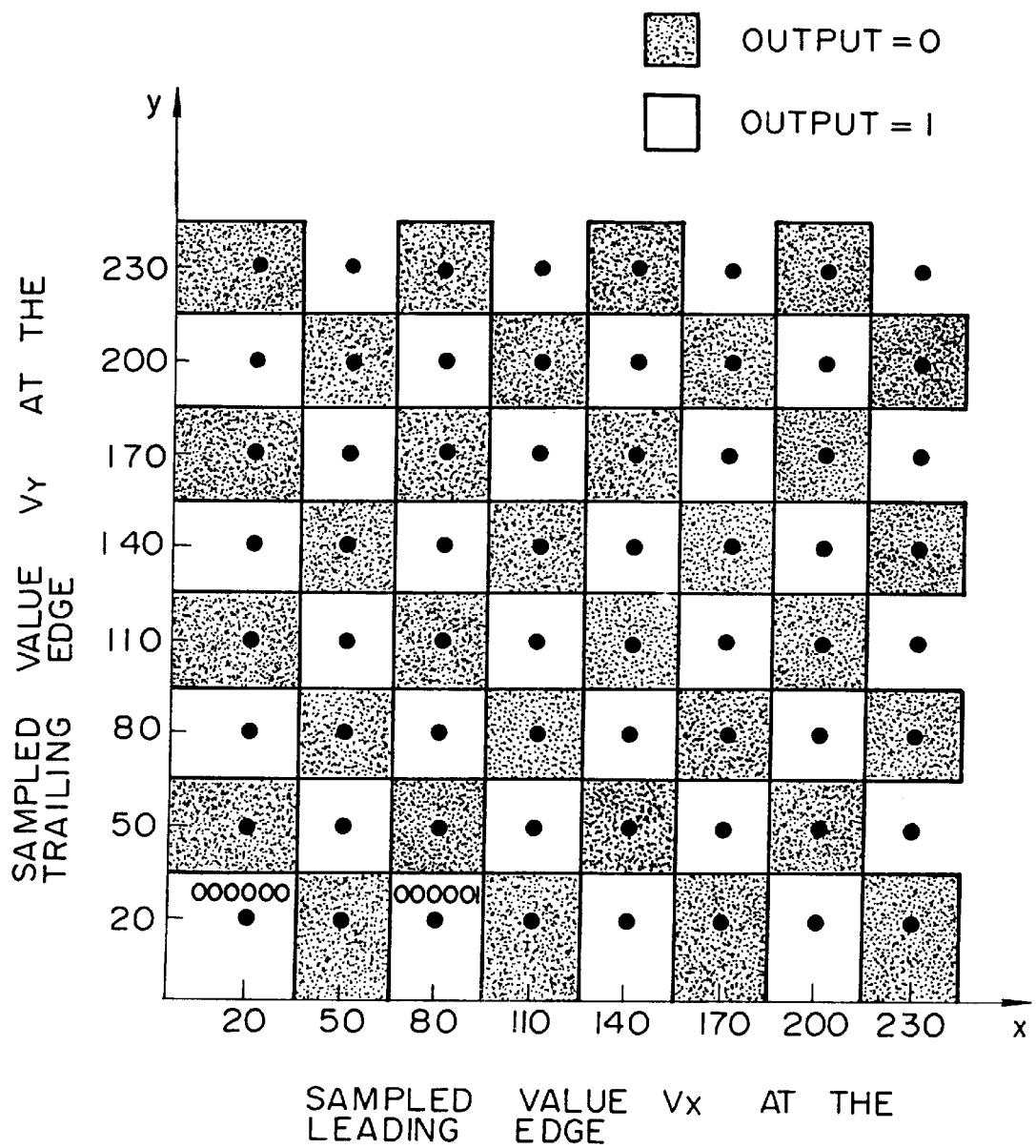
FIG. 24 is a diagram illustrating a decoding table A stored in a memory 141.

FIG. 24 illustrates the decoding table A. As shown in FIG. 24, the decoding table A includes coordinate points equivalent to those plotted on the two-dimensional plane shown in FIG. 22 wherein these coordinate points are separated from each other by straight lines lying at the middle between each pair of the nearest neighboring points. In FIG. 24, the coordinate points in open square areas correspond to decoded values whose 0th bit is 0 while those lying in shaded square areas correspond to decoded values whose 0th bit is 1. In other words, the position information X and Y are assigned the coordinate points shown in FIG. 16 so that such the decoded values can be obtained via the decoding table shown in FIG. 24.

Therefore, if the sampled value (VX, VY) applied as the address to the memory 141 falls in an open square area, then the 0th bit of the decoded value output by the memory 141 has a value of 0. On the other hand, if the sampled value (VX, VY) applied as the address to the memory 141 falls in a shaded square area, then the 0th bit of the decoded value output by the memory 141 has a value of 1. In this way, the value which is most likely to be valid for the 0th bit is obtained from the sampled value (VX, VY) of the RF signal.

The decoded value at the 0th bit output from the memory 141 is then supplied to the BCH error correcting circuit 142. If a sampled value (VX, VY) which should be in an open (or shaded) area is incorrectly placed in an adjacent shaded (or open) area caused by noise, the 0th bit which should be decoded into 0 (or 1) is incorrectly decoded into 1 (or 1). However, if the 0th bits of one block of decoded data are taken, the series of the 0th bits contains a 12-bit BCH-1 code in its end portion. Therefore, as described earlier, if the number of errors is equal to or less than two, the errors in the 0th bits can be corrected using the BCH-1 code.

Thus, the BCH error correcting circuit 142 corrects errors in 0th bits using the BCH-1 code.

Figure 25:
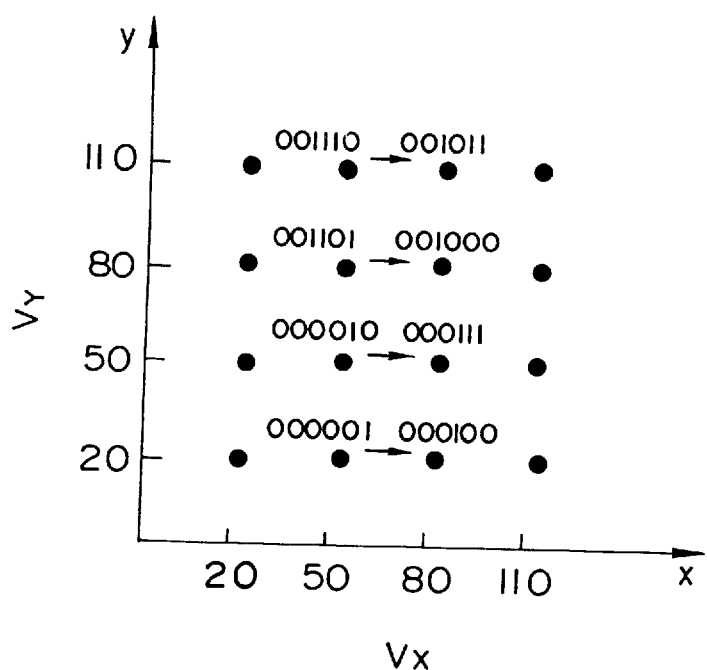
FIG. 25 is a schematic representation of occurrence of a 2-bit error in a decoded value.

In FIG. 24, if a sampled value (VX, VY) which should be in an open area containing a coordinate point for example (20, 20) is erroneously placed for example in an adjacent shaded area containing a coordinate point (50, 20), a correct decoded value 000000 can be obtained by correcting the invalid value of 1 at the 0th bit into a correct value of 0. However, an error in a decoded value, which occurs when a sampled value is erroneously placed in an incorrect area, is not limited to 0th bits. For example as shown in FIG. 25, if a sample point which should be placed in an area containing a coordinate point (50, 110), (50, 80), (50, 50), or (50, 20) is erroneously placed in an adjacent area containing a coordinate point (80, 110), (80, 80), (80, 50), or (80, 20) located at the right side of the correct area, then an error occurs not only at the 0th bit but also at the 2nd bit.

To deal with such the errors, the memory 143 decodes the sampled value (VX, VY) again depending on the result of the 0th-bit error correction performed by the BCH error correcting circuit 142.

That is, the BCH error correcting circuit 142 outputs the correction result (0 or 1) associated with the 0th bit, and the correction result is supplied as the switching signal to the memory 143. At the same time, the sampled values VX and VY temporarily stored in the FIFOs 144 and 145, respectively, are also supplied to the memory 143 . This means that the FIFOs 144 and 145 store the sampled values VX and VY, respectively, for a time period from the time at which the sampled values VX and VY are input to the error correcting circuit 35 until the decoded value at the 0th bit is output from the memory 141 and then the switching signal is output from the BCH error correcting circuit 142. Then, the FIFOs 144 and 145 output the stored sampled values VX and VY.

On the basis of the switching signal received from the BCH error correcting circuit 142, the memory 143 determines which of the decoding tables B0 and B1 is to be used. Then the memory 143 extracts decoded data in the 6-bit format from the sampled values VX and VY given as the address using the selected decoding table.

Figure 26:
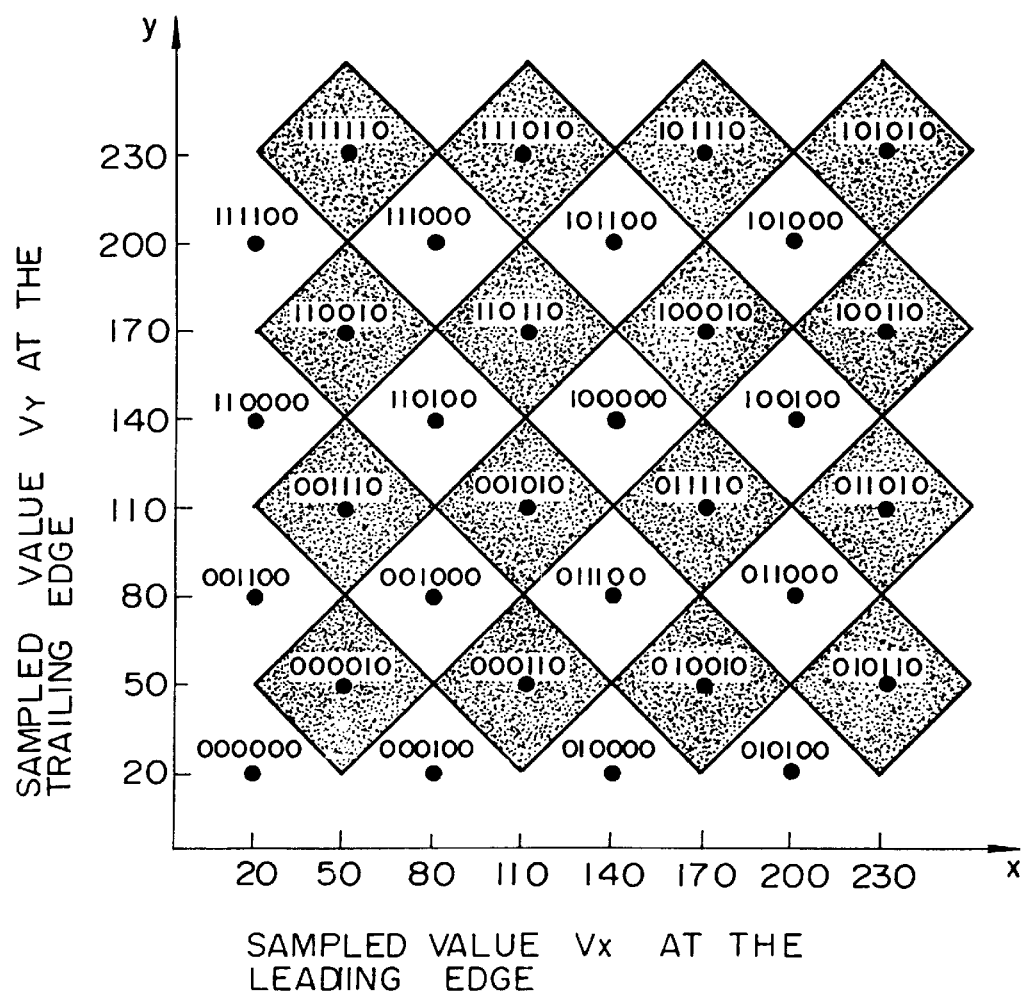
FIG. 26 is a diagram illustrating a decoding table B0 stored in a memory 143.
Figure 27:
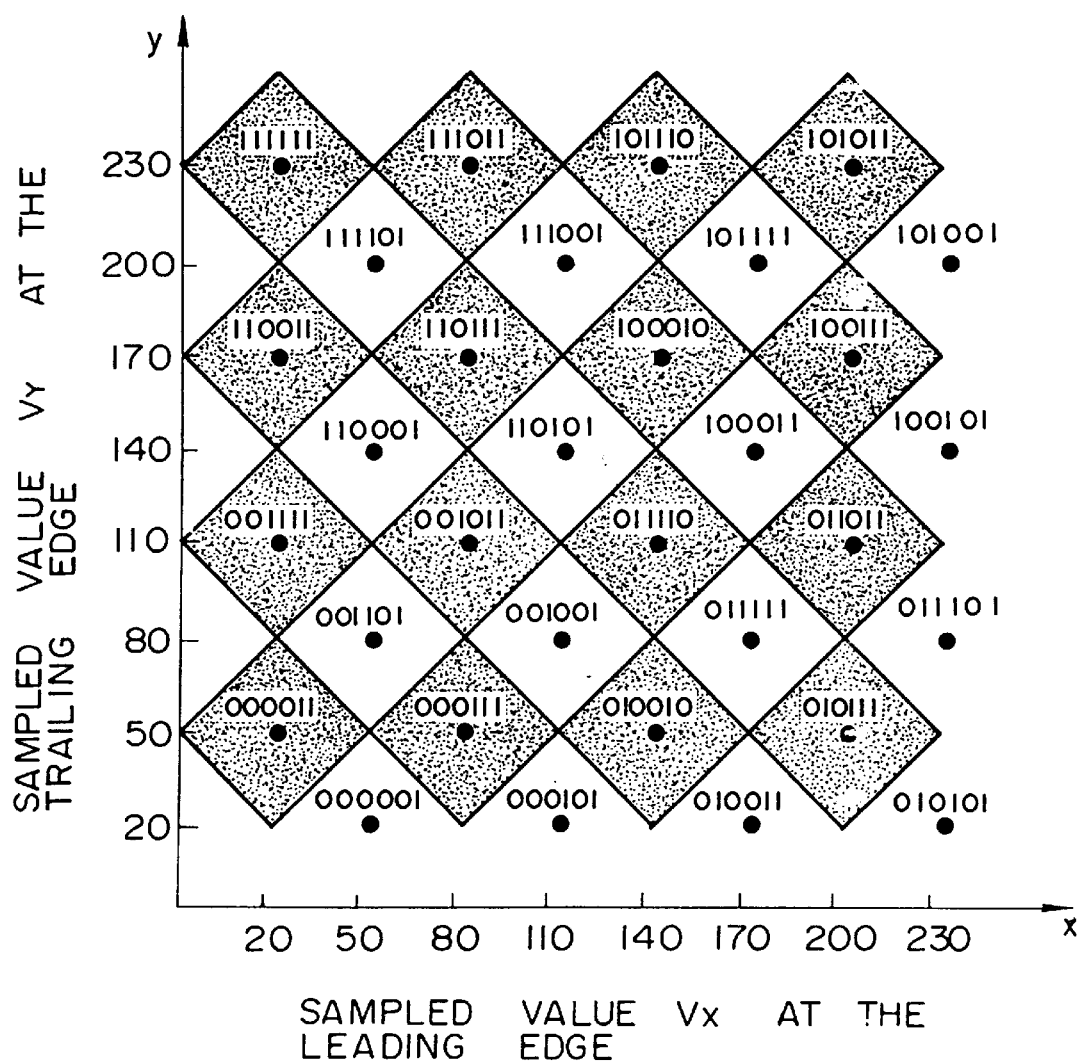
FIG. 27 is a diagram illustrating a decoding table B1 stored in the memory 143.

FIGS. 26 and 27 illustrate the decoding tables B0 and B1, respectively. As shown in FIG. 26, the decoding table B0 consists of a subset of the coordinate points plotted on the two-dimensional plane shown in FIG. 22 wherein the elements in the subset are selected so that the 0th bit of the decoded values corresponding to the coordinate points in the subset is 0 and these coordinate points are separated from each other by straight lines lying at the middle between each pair of the nearest neighboring points. In FIG. 26, the coordinate points in open square areas correspond to the decoded values whose 1st bit is 0 while those lying in shaded square areas correspond to the decoded values whose 1st bit is 1. In other words, the position information X and Y are assigned the coordinate points shown in FIG. 16 so that such the decoded values can be obtained via the decoding table B0 shown in FIG. 26. Therefore, the 1st and 0th bits of a decoded value corresponding to a coordinate point in any open area are 00 while those of a decoded value corresponding to a coordinate point in any shaded area are 10.

On the other hand, as shown in FIG. 27, the decoding table B1 consists of another subset of the coordinate points plotted on the two-dimensional plane shown in FIG. 22 wherein the elements of the subset are selected so that the 0th bit of the decoded values corresponding to the coordinate points of the subset is 1 and these coordinate points are separated from each other by straight lines lying at the middle between each pair of the nearest neighboring points. In FIG. 27, the coordinate points in open square areas correspond to the decoded values whose 1st bit is 0 while those lying in shaded square areas correspond to the decoded values whose 1st bit is 1. The position information X and Y are assigned the coordinate points shown in FIG. 16 so that such the decoded values can be obtained via the decoding table B1 shown in FIG. 27. Therefore, the 1st and 0th bits of a decoded value corresponding to a coordinate point in any open area are 01 while those of a decoded value corresponding to a coordinate point in any shaded area are 11.

If the switching signal received from the BCH error correcting circuit 142 indicates that the result of the error correction on the 0th bit of the decoded value is 0, the memory 143 selects the decoding table B0, while the decoding table B1 is selected in the case where the result of the error correction is 1. Then, 6-bit data assigned to the coordinate point nearest to the sampled value (VX, VY) given as the address is employed and output as the decoded value for that sampled value.

The number of the coordinate points contained in the decoding tables B0 and B1 is 32, which is half that of the decoding table A. Therefore, each unit area containing a coordinate point is greater than that of the table A. This means that even if a sample point is deviated from a correct coordinate point to a rather great degree, it is possible to correctly decode the sample point to 6-bit data having a value assigned to that coordinate point.

As described above, even if a fluctuation occurs in the RF signal level due to noise, an error can be corrected using the BCH-1 code having a small amount of redundancy thereby preventing the sampled value from being decoded into incorrect 6-bit data corresponding to a coordinate point adjacent to the correct coordinate point.

In the embodiment described above, an error is corrected using the BCH-1 code added at the 0th bits. As described earlier, a BCH code (BCH-2 code) is also added at the 1st bits and this BCH-2 code leads to a further improvement in the reliability in correcting an error as described below.

Figure 28:
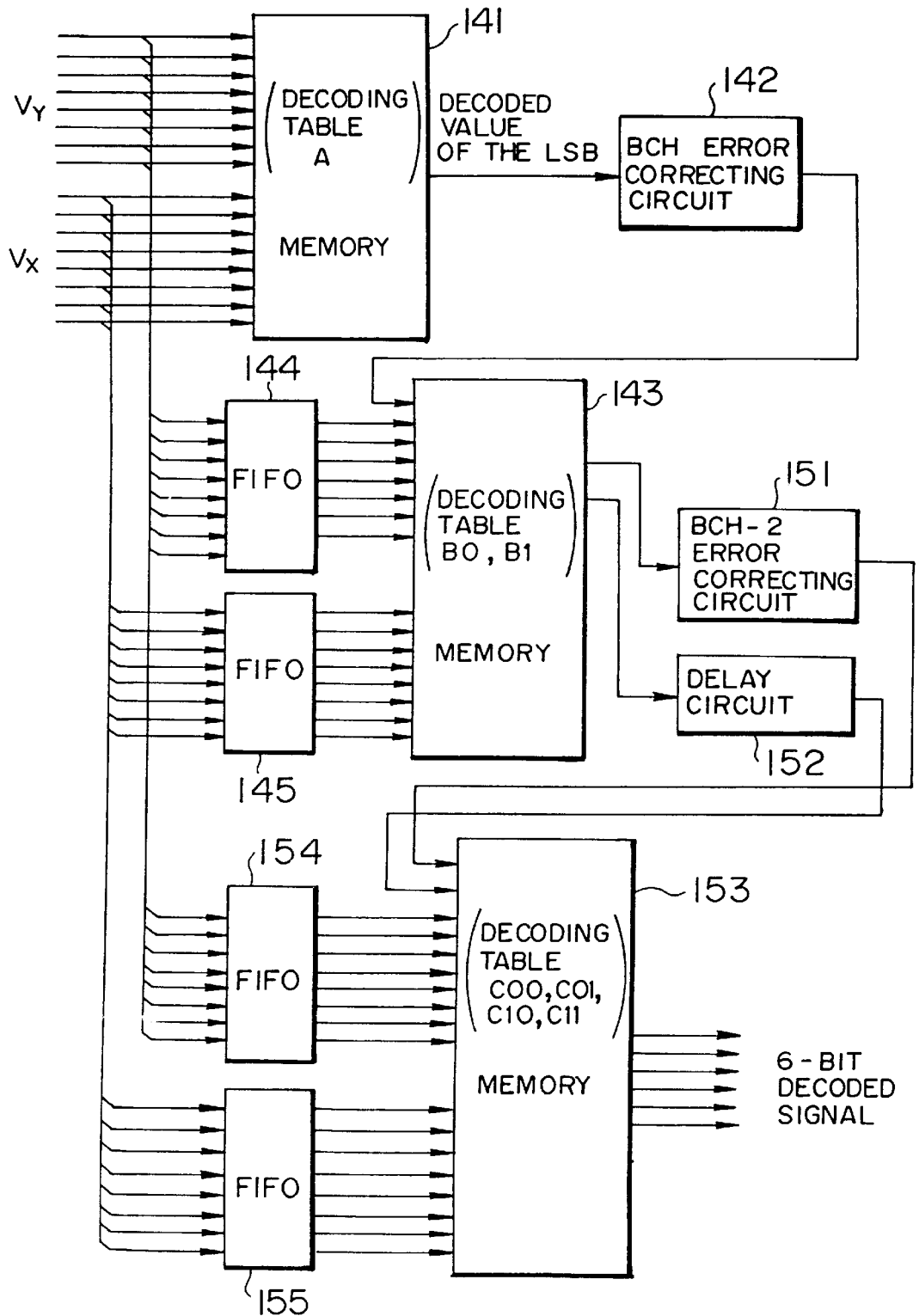
FIG. 28 is a block diagram illustrating the details of another embodiment of the error correcting circuit 35.

FIG. 28 illustrates an error correcting circuit 35 in which both BCH-1 and BCH-2 codes are used to correct an error in the decoded data. In FIG. 28, similar elements to those of FIG. 23 are denoted by similar reference numerals. As shown in FIG. 28, the error correcting circuit 35 includes a BCH error correcting circuit 151, a delay circuit 152, a memory 153, FIFOs 154 and 155, and other elements similar to those used in the error correcting circuit shown in FIG. 23. Unlike the error correcting circuit shown in FIG. 23 in which the final 6-bit decoded data are output from the memory 143, the memory 143 of FIG. 28 outputs the 1st bit of the decoded data and also the error correction result associated with the 0th bit output as the switching signal from the BCH error correcting circuit 142 wherein the 1st bit of the decoded value is supplied to the BCH error correcting circuit 151 and the error correction result of the 0th bit of the decoded value is supplied to the delay circuit 152.

In this error correcting circuit 35, a sampled value (VX, VY) is applied to the memory 141, the FIFOs 144 and 145, and the FIFOs 154 and 155. The memory 141, the BCH error correcting circuit 142, the memory 143, and the FIFOs 144 and 145 operate in a manner similar to those in FIG. 23. As a result of the operation of these elements, the memory 143 outputs the 1st bit of the decoded value to the BCH error correcting circuit 151 and also outputs the error correction result of the 0th bit of the decoded value to the delay circuit 152.

The BCH error correcting circuit 151 detects an error at the 1st bits of the decoded data and corrects the error. If the 1st bits of one block of decoded data are taken, the series of the 1st bits contains a 6-bit BCH-2 code in its end portion. Thus, the BCH error correcting circuit 151 corrects an error in the 1st bits of the decoded data using the BCH-2 code. The corrected result of the 1st bits of the decoded data is supplied to the memory 153.

Although the BCH-2 code consists of 6 bits, and thus the code length of the BCH-2 is smaller than that of the BCH-1 code, the BCH-2 code is effective to correct an error as described below. In this invention, as described above, 6-bit binary numbers are assigned to coordinate points in such a manner shown in FIG. 16. Therefore, an error in the 1st bits causes a sample value to be shifted from its correct coordinate point to an adjacent area in an oblique direction in the mapping diagram shown in FIG. 22. The distance from a certain coordinate point to an adjacent coordinate point in an oblique direction is greater than the distance to an adjacent coordinate point in X or Y direction. Therefore, the probability that a sampled value is shifted into an adjacent area in an oblique direction is lower than the probability that the sampled value is shifted into an adjacent area in the X or Y direction.

Therefore, although the BCH-2 code consists of only 6 bits and has a small amount of redundancy and thus its ability to correct an error is lower than that of the BCH-1 code, the BCH-2 code can be effectively used to correct an error since the probability that the 1st bits are in error is low enough.

After a time delay required for the BCH error correcting circuit 151 to perform its operation has been elapsed, the delay circuit 152 supplies the correction result of the 0th bits of the decoded data to the memory 153. If the correction results of the 1st and 0th bits of the decoded data have been output from the BCH error correcting circuits 151 and 152, respectively, the FIFOs 154 and 155 output the sampled value (VX, VY) to the memory 153.

The memory 153 stores decoding tables C00, C01, C10, and C11. The decoding table C00 consists of a subset of the coordinate points plotted on the two-dimensional plane shown in FIG. 26 wherein the elements of the subset are selected so that the (1st bit, 0th bit) of the decoded values corresponding to the coordinate points of the subset is (0, 0) and these coordinate points are separated from each other by straight lines lying at the middle between each pair of the nearest neighboring points. The decoding table C01 consists of a subset of the coordinate points plotted on the two-dimensional plane shown in FIG. 26 wherein the elements of the subset are selected so that the (1st bit, 0th bit) of the decoded values corresponding to the coordinate points of the subset is (0, 1) and these coordinate points are separated from each other by straight lines lying at the middle between each pair of the nearest neighboring points.

The decoding table C10 consists of a subset of the coordinate points plotted on the two-dimensional plane shown in FIG. 27 wherein the elements of the subset are selected so that (1st bit, 0th bit) of the decoded values corresponding to the coordinate points of the subset is (1, 0) and these coordinate points are separated from each other by straight lines lying at the middle between each pair of the nearest neighboring points. The decoding table C11 consists of a subset of the coordinate points plotted on the two-dimensional plane shown in FIG. 27 wherein the elements of the subset are selected so that (1st bit, 0th bit) of the decoded values corresponding to the coordinate points of the subset is (1, 1) and these coordinate points are separated from each other by straight lines lying at the middle between each pair of the nearest neighboring points.

The memory 153 selects the decoding table C00 if the correction result (correction result of the 1st bit of the decoded data, correction result of the 0th bit of the decoded data) is (0, 0). The memory 153 selects the decoding table C00 if the corrected result is (0, 1). Similarly, the decoding table C10 is selected if the correction result is (1, 0), and C11 is selected if the correction result is (1, 1). Thus, 6-bit data assigned to the coordinate point nearest to the sampled value (VX, VY) given as the address is employed and output as the decoded value for that sampled value.

The number of the coordinate points contained in the decoding tables C00, C01, C10, and C11 is 16, which is half that of the decoding tables B0 and B1, and a quarter that of the decoding table A. Therefore, each unit area containing a coordinate point is greater than that of any of the tables A, B0, and B1. This means that even if a sample point is deviated from a correct coordinate point to a greater degree, it is possible to correctly decode the sample point to 6-bit data having a value assigned to that coordinate point.

Referring again to FIG. 20, the data in the 6-bit format decoded by the error correcting circuit 35 are supplied to the unit-data-length conversion circuit 36 which in turn converts the received data into a 8-bit format. The resultant data are then supplied to the error correcting circuit 37. The error correcting circuit 37 performs detection and correction of an error, caused mainly by defects, in the decoded signal in the 8-bit format supplied from the unit-data-length conversion circuit 36 using the above-described CIRC.

In the present invention, as described above, digital information in a format consisting of a predetermined unit number of bits, for example 6 bits, is recorded in the form of pits in such a manner that the shape of each pit is discretely changed according to the value of each 6-bit unit of the digital data wherein BCH-1 and BCH-2 codes are added as error correction codes for certain bits, for example, the 0th and 1st bits of the predetermined plurality of bits. As a result, it is possible to correct an error using the error correction codes having a short code length without a significant reduction in the recording capacity.

Coordinate points corresponding to 6-bit digital data in a two-dimensional plane are divided into two groups so that any coordinate points nearest to each other are separated into different groups. After that, 6-bit binary numbers are mapped to the coordinate points on the basis of the value of the 0th bit in such a manner that 6-bit binary numbers whose 0th bit is 0 are mapped to the coordinate points in one of the above groups, and 6-bit binary numbers whose 0th bit is 1 are mapped to the coordinate points in the other group. Furthermore, the coordinate points of each group are further divided into two subgroups so that any two coordinate points nearest to each other are separated into different subgroups. The 6-bit binary numbers belonging to each group are mapped to the coordinate points of either subgroup on the basis of the value of the 1st bit. The grouping and mapping process is performed repeatedly in a similar manner on the basis of the value of each bit from 2nd to 5th bit so that 6-bit digital information is assigned the coordinate points in the two-dimensional plane and the resultant x and y coordinates of the coordinate points are recorded. In this technique, the probability that an error occurs during a reproducing operation at the bits with respect to which mapping is performed at later mapping process stages is low enough. Therefore, it is possible to effectively correct an error only by adding error correction codes for the 0th and 1st bits with respect to which the mapping is performed at earliest mapping process stages.

In a reproducing operation, the value of the bit with respect to which the first mapping is performed is decoded from a sampled value (VX, VY) on the basis of the coordinate points in the two-dimensional plane. Then, error correction is performed for that bit using the error correction code. Of the coordinate points which have been used in the previous decoding process, those coordinate points which are assigned binary numbers having the bit consistent with the result of the error correction are employed to decode the bit with respect to which the next mapping has been performed. Error correction is then performed on that bit using the error correction code. The above process is performed repeatedly until the decoding of the digital information is completed for all the bits at which error correction codes are added. That is, in the present embodiment, the value of the 0th bit with respect to which the first mapping has been performed is decoded from a sampled value (VX, VY) on the basis of the coordinate points in the two-dimensional plane. Then, error correction is performed for the 0th bit using the error correction code. Of the coordinate points which have been used to decode the 0th bit, those coordinate points which are assigned the bit consistent with the result of the error correction are employed to decode the 1st bit with respect to which the next mapping has been performed. Error correction is then performed on that bit using the error correction code. Of the coordinate points which have been used to decode the 1st bits, those coordinate points which are assigned the bit consistent with the result of the above error correction are employed to decode the sampled value. In this way, errors due to the fluctuations in the RF signal level are corrected and thus a correct decoded value can be obtained.

Although the present invention has been described above with reference to preferred embodiments applied to an optical disk, the present invention can also be applied to other recording media such as a magneto-optic disk.

In the embodiments described above, the processing is performed on data in units of 6 bits. Alternatively, the processing may also be performed on data in units of another number of bits. In this case, it is required that the number of positions at which the pit edge can be situated should be consistent with the number of bits constituting each unit of data.

Furthermore, in the embodiments described above, the data consisting of 264 bits (8 bits×33 rows) shown in FIG. 4 is converted into data consisting of 6 bits×35 rows, 5 bits×6 rows, and 4 bits×6 rows as shown in FIG. 5 wherein a 12-bit BCH-1 code and a 6-bit BCH-2 code are added at the 0th bits and the 1st bits, respectively. However, the present invention is not limited to that, and it is also possible to convert the data into other formats. For example, data consisting of 264 bits (8 bits×33 rows) may be converted into a format consisting of 6 bits×37 rows, 5 bits×4 rows, and 4 bits×5 rows. In this case, a 9-bit error correction code is added at the 0th bits and a 5-bit error correction code is added at the 1st bits.

Alternatively, data may be converted into a format consisting of 6 bits×35 rows, 5 bits×6 rows, 4 bits×4 rows, and 2 bits×4 rows. In this case, 14-, 8-, 2-, and 2-bit error correction codes are added at the 0th, 1st, 2nd, and 3rd bits, respectively.

Furthermore, in the embodiments described above, an error correction code is added at the 0th bits and 1st bits. Alternatively, an error correction code may also be added only at either the 0th bits or the 1st bits, or otherwise at other bits.

Furthermore, in the embodiments described above, 6-bit binary numbers are assigned to coordinate points shown in FIG. 16 by mapping the 6-bit binary numbers to the coordinate points bit by bit from the 0th bit to the 5th bit. However, the present invention is not limited to that. The mapping may also be performed in different orders. For example, 6-bit binary numbers may be mapped to coordinate points bit by bit from the 5th bit to the 0th bit. Otherwise, mapping may be performed in a random order. As described earlier, the probability that an error occurs at the bit with respect to which mapping is performed at an early mapping process stage is greater than the probability that an error occurs at the bit with respect to which mapping is performed at a later mapping process stage. Therefore, it is desirable that an error correction code should be added at bits with respect to which mapping is performed at early mapping process stages. It is more desirable that an error correction code having a higher ability of correcting an error should be added at the bit with respect to which mapping is performed at an earlier mapping process stage.

Furthermore, in the embodiments described above, pits are formed in such a manner that the edge of each pit is shifted discretely. Alternatively, the shape of each pit may be changed in a discrete fashion. For example, pits could be formed as physically recessed or raised portions so that the depth or height of each recessed or raised portion is changed in a discrete fashion according to the digital information to be recorded.

Furthermore, in the embodiments described above, both the rising and falling edges of each pit are shifted in a discrete fashion. Alternatively, only either the rising edge or the falling edge may be shifted. In this case, of the coordinate points in the two-dimensional plane shown in FIG. 16, coordinate points either along the x axis or along the y axis may be employed.

Furthermore, in the embodiments described above, the BCH code is employed as the error correction code for correcting an error at some bits of 6-bit data. Alternatively, an error correction code such as a convolution code may be employed for correcting an error for each bit.

What is claimed is:

1. An apparatus for generating error correction codes for use with an information recording device, wherein the apparatus processes digital information in units of a predetermined plurality of bits, said modulating circuit comprising:

means for assigning, dividing and mapping, operative to assign said units to coordinate points in a two-dimensional plane, said coordinate points being defined in relation to respective values the digital information can have, wherein said means for assigning, dividing and mapping is operative to divide said coordinate points into two groups so that any coordinate points nearest to each other are separated into different groups, wherein said means for assigning, dividing and mapping is operative to map a first predetermined bit in such a manner that digital information consisting of said plurality of bits having a value whose predetermined bit is 0 is assigned a coordinate point belonging to a first group and digital information having a value whose predetermined bit is 1 is assigned a coordinate point belonging to a second group, wherein said means for assigning, dividing and mapping is operative to divide the coordinate points belonging to each group into two subgroups so that any coordinate points nearest to each other are separated into different subgroups, wherein said means for assigning, dividing and mapping is operative to map another predetermined bit of the digital information in the same way mapping was performed on the first predetermined bit, so that digital information consisting of said plurality of bits is assigned a coordinate point in either subgroup, thereby recording the x and y coordinates of the coordinate point corresponding to said digital information consisting of said plurality of bits; and means for outputting the x and y coordinates of at least one of the coordinate points corresponding to said digital information consisting of said plurality of bits from said means for assigning, dividing and mapping.

2. An apparatus according to claim 1, wherein an error correction code is added in advance to at least one of the predetermined plurality of bits.

3. An apparatus according to claim 2, wherein mapping is performed with respect to the bit or bits to which said error correction code is added before mapping the other bits.

4. An apparatus according to claim 3, wherein an error correction code is added in advance to one of said predetermined plurality of bits and mapping with respect to said bit is performed first.

5. An apparatus according to claim 3, wherein error correction codes are added to two of said predetermined bits of digital information in advance, mapping with respect to one of said predetermined bits is performed earlier, and mapping with respect to the other of said predetermined bits is performed later.

6. An apparatus according to claim 5, wherein said error correction codes have different error correcting abilities from each other; and earlier mapping with respect to the bit to which the error correction code having a higher correcting ability is added and for later mapping with respect to the other bit.

7. An apparatus according any of claims 2 to 6, wherein at least one of said error correction codes which are added in advance is a BCH code or a convolution code.

8. A method of generating error correction codes for digital information which is in units of a predetermined plurality of bits, comprising the steps of:

assigning said units to coordinate points in a two-dimensional plane, said coordinate points being defined in relation to the respective values the digital information can have;

dividing said coordinate points into two groups so that any coordinate points nearest to each other are separated into different groups;

mapping a first predetermined bit in such a manner that digital information consisting of said plurality of bits having a value whose predetermined bit is 0 is assigned a coordinate point belonging to a first group and digital information having a value whose predetermined bit is 1 is assigned a coordinate point belonging to a second group; and dividing the coordinate points belonging to each group into two subgroups so that any coordinate points nearest to each other are separated into different subgroups; and mapping another predetermined bit of the digital information in the same way mapping was performed on the first predetermined bit, so that digital information consisting of said plurality of bits is assigned a coordinate point in either subgroup, thereby recording the x and y coordinates of the coordinate point corresponding to said digital information consisting of said plurality of bits.

9. The method according to claim 5, further comprising the step of adding an error correction code in advance to at least one of said bits of digital information.

10. The method according to claim 9, further comprising the step of mapping said bit or bits to which said error correction code is added before mapping the other bits.

11. The method according to claim 10, further comprising the step of first mapping said bit or bits to which said error correction code is added.

12. The method according to claim 10, further comprising the steps of adding error correction codes to two predetermined bits of digital information in advance, of mapping one of said predetermined bits earlier, and of mapping the other of said predetermined bits later.

13. The method according to claim 11, wherein said error correction codes for correcting an error at said predetermined two bits of digital information have different error correcting abilities from each other;

the step of mapping the bit to which the error correction code having a greater error correcting ability is added; and the later step of mapping the other bit.

14. The methods according any of claims 9 to 13, wherein at least one of said error correction codes is a BCH code or a convolution code.

* * * * *